(12) United States Patent
Kawauchi et al.

(10) Patent No.: US 8,437,426 B2
(45) Date of Patent: May 7, 2013

(54) RECEIVING APPARATUS, RECEIVING METHOD, AND PROGRAM

(75) Inventors: Hidetoshi Kawauchi, Kanagawa (JP); Masayuki Hattori, Kanagawa (JP); Toshiyuki Miyauchi, Kanagawa (JP); Takashi Yokokawa, Kanagawa (JP); Kazuhiro Shimizu, Kanagawa (JP); Kazuhisa Funamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 884 days.

(21) Appl. No.: 12/567,856

(22) Filed: Sep. 28, 2009

(65) Prior Publication Data

US 2010/0080330 A1 Apr. 1, 2010

(30) Foreign Application Priority Data

Sep. 30, 2008 (JP) ................................ P2008-253299

(51) Int. Cl.
*H04B 1/38* (2006.01)
*H04N 7/12* (2006.01)
*H04L 27/00* (2006.01)

(52) U.S. Cl.
USPC ....... 375/316; 375/219; 375/240.26; 375/295

(58) Field of Classification Search .................. 375/211, 375/219, 229–236, 240.26–240.29, 284–285, 375/295, 316, 345, 354, 355, 359, 360, 362, 375/370, 369; 370/203, 210, 208, 319, 329, 370/344, 478, 480; 455/91, 95, 130, 132

See application file for complete search history.

(56) References Cited

U.S. PATENT DOCUMENTS

| 7,447,277 | B2 * | 11/2008 | Yajima et al. | 375/326 |
| 7,664,189 | B2 * | 2/2010 | Kawauchi | 375/260 |
| 7,701,841 | B2 * | 4/2010 | Kawauchi et al. | 370/210 |
| 7,817,738 | B2 * | 10/2010 | Takeuchi et al. | 375/260 |
| 7,933,349 | B2 * | 4/2011 | Kawauchi et al. | 375/260 |
| 8,077,781 | B2 * | 12/2011 | Ido | 375/260 |
| 8,155,223 | B2 * | 4/2012 | Miyauchi et al. | 375/260 |

(Continued)

FOREIGN PATENT DOCUMENTS

| EP | 1 416 693 | 5/2004 |
| EP | 1 624 602 | 2/2006 |

(Continued)

*Primary Examiner* — Sam K Ahn
*Assistant Examiner* — Linda Wong
(74) *Attorney, Agent, or Firm* — Frommer Lawrence & Haug LLP; William S. Frommer

(57) ABSTRACT

Disclosed herein is a receiving apparatus including: first to third position determination sections configured to determine the start position of an FFT interval which serves as a signal interval targeted for FFT by an FFT section; a selection section configured to select one of those start positions of the FFT interval which are determined by the first through the third position determination section; and the FFT section configured to perform FFT on the OFDM time domain signal by regarding the start position selected by the selection section as the start position of the FFT interval in order to generate the first OFDM frequency domain signal.

9 Claims, 20 Drawing Sheets

U.S. PATENT DOCUMENTS

| | | | |
|---|---|---|---|
| 2003/0016773 A1* | 1/2003 | Atungsiri et al. | 375/355 |
| 2005/0117667 A1* | 6/2005 | Yajima et al. | 375/324 |
| 2005/0179570 A1* | 8/2005 | Yagi et al. | 341/60 |
| 2005/0232217 A1* | 10/2005 | Do et al. | 370/343 |
| 2007/0070882 A1* | 3/2007 | Kawauchi et al. | 370/210 |
| 2007/0280364 A1* | 12/2007 | Adachi | 375/260 |
| 2009/0060100 A1* | 3/2009 | Nishio et al. | 375/344 |
| 2009/0092197 A1* | 4/2009 | Okamoto et al. | 375/260 |
| 2009/0274038 A1* | 11/2009 | Takeuchi et al. | 370/210 |
| 2010/0061478 A1* | 3/2010 | Liu et al. | 375/267 |
| 2010/0061493 A1* | 3/2010 | Takahashi et al. | 375/343 |
| 2010/0074382 A1* | 3/2010 | Miyauchi et al. | 375/347 |
| 2010/0128822 A1* | 5/2010 | Ouchi et al. | 375/343 |

FOREIGN PATENT DOCUMENTS

| | | |
|---|---|---|
| EP | 1 814 274 | 8/2007 |
| JP | 10 112736 | 4/1998 |
| JP | 2000 332727 | 11/2000 |
| JP | 2003 229833 | 8/2003 |
| JP | 2004 32030 | 1/2004 |
| JP | 2004 179816 | 6/2004 |
| JP | 2004 336279 | 11/2004 |
| JP | 2005-303440 | 10/2005 |
| WO | WO 2004 100413 | 11/2004 |

* cited by examiner

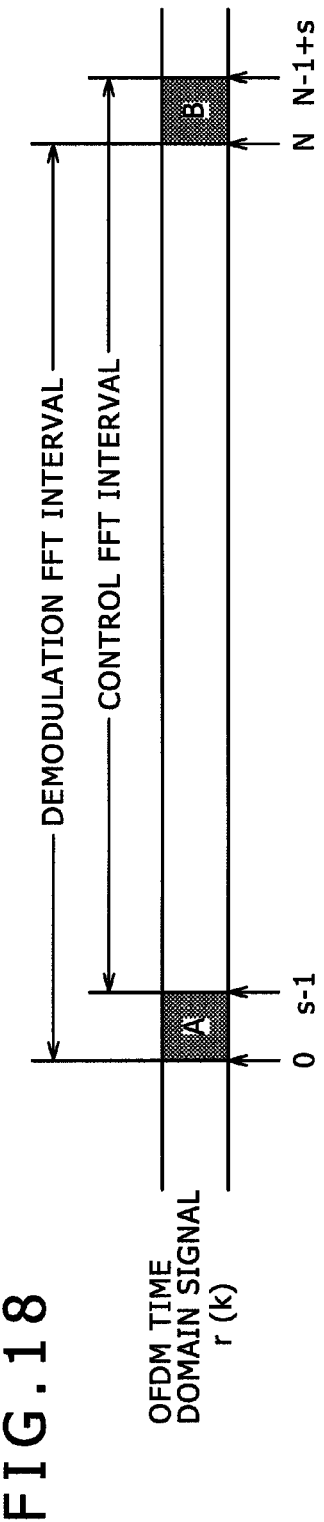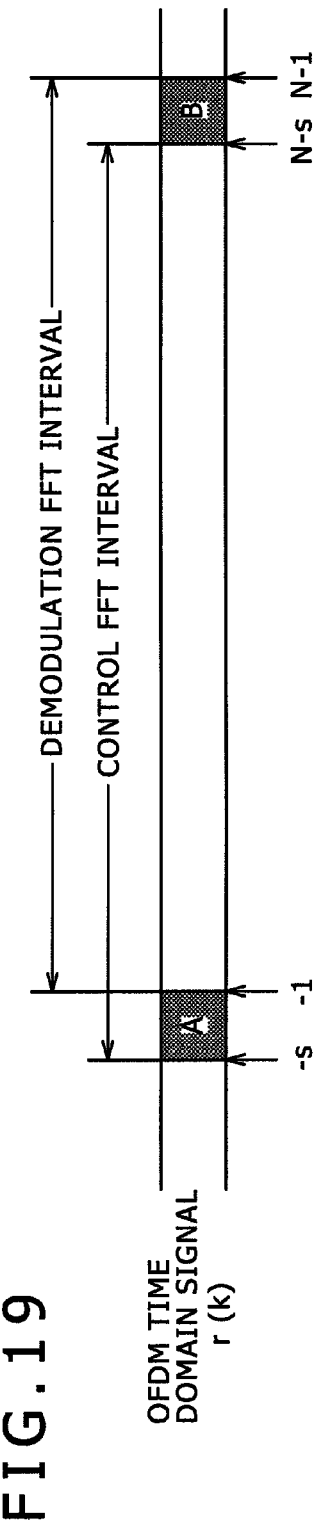

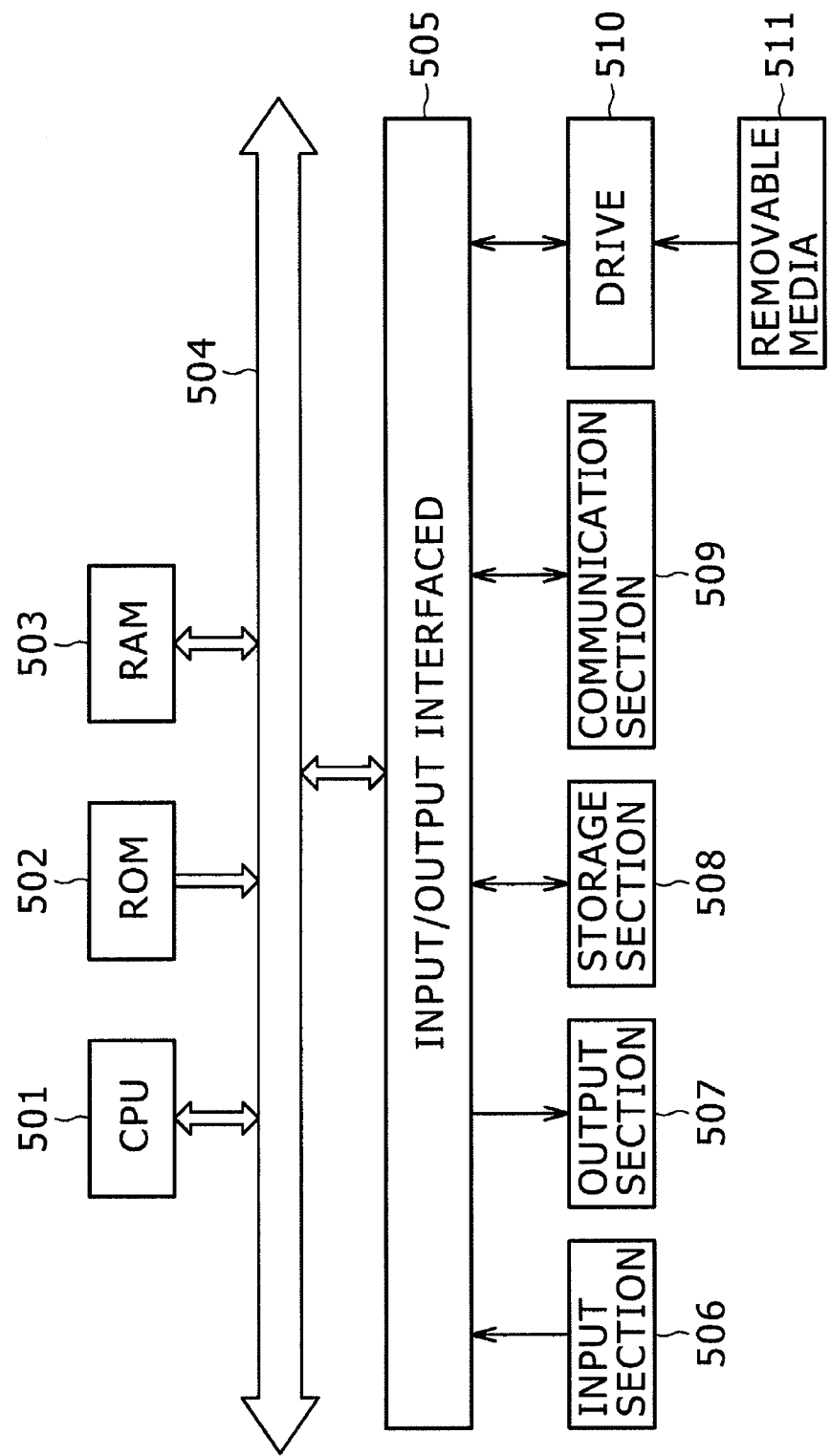

RECEIVING APPARATUS, RECEIVING METHOD, AND PROGRAM

BACKGROUND OF THE INVENTION

1. Field of the Invention

The present invention relates to a receiving apparatus, a receiving method, and a program. More particularly, the invention relates to a receiving apparatus, a receiving method, and a program whereby the manner in which to synchronize OFDM (Orthogonal Frequency Division Multiplexing) symbols is switched according to the circumstances.

2. Description of the Related Art

One modulation technique in use today for terrestrial digital broadcasting is called OFDM. According to the OFDM technique, numerous orthogonal subcarriers are provided within the transmission frequency band. Data is assigned to the amplitude and phase of each subcarrier and is digitally modulated through PSK (Phase Shift Keying) or QAM (Quadrature Amplitude Modulation).

The OFDM technique involves dividing the entire transmission band by a large number of subcarriers. That means bandwidth is limited and transmission speed is lowered per subcarrier but that the total transmission speed remains the same as that of traditional modulation techniques.

According to the OFDM technique, data is assigned to a plurality of subcarriers so that the data is modulated by performing IFFT (Inverse Fast Fourier Transform) operations. An OFDM signal resulting from the modulation is demodulated by executing FFT (Fast Fourier Transform) operations.

It follows that the apparatus for transmitting the OFDM signal may be composed of IFFT-related circuits and that the apparatus for receiving the OFDM signal may be formed by FFT-related circuits.

Given the above-outlined features, the OFDM technique has been applied frequently to terrestrial digital broadcasting setups highly vulnerable to multipath interference. The terrestrial digital broadcasting standards that have adopted the OFDM technique include DVB-T (Digital Video Broadcasting-Terrestrial), ISDB-T (Integrated Services Digital Broadcasting-Terrestrial) and ISDB-TSB.

FIG. 1 shows OFDM symbols. According to the OFDM technique, signal transmission takes place in units called OFDM symbols. As shown in FIG. 1, one OFDM symbol is constituted by an effective symbol representing a signal interval during which IFFT is carried out upon transmission, and by a guard interval (called the GI hereunder) to which a partial waveform towards the end of the effective symbol is copied.

A GI is inserted chronologically in front of the effective symbol. According to the OFDM technique, inserting the GI makes it possible to prevent interference which can occur between OFDM symbols in a multipath environment.

A plurality of such OFDM symbols are put together to form a single OFDM transmission frame. Illustratively, one OFDM transmission frame is formed by 204 OFDM symbols according to the ISDB-T standard. The position in which to insert a pilot signal is determined in units of the OFDM transmission frame.

The OFDM technique involves the use of QAM-based methods for modulating subcarriers. It follows the OFDM technique is susceptible to adverse effects such as multipath interference during transmission, with the result that the amplitude and phase of each subcarrier can turn out to be different upon receipt from what they were at the outset. Multipath interference may be caused illustratively by reflections from mountains and buildings or by SFN (single frequency network).

On the receiving side, it is thus necessary to equalize signals in order to make sure that the amplitude and phase of the received signal become the same as those initially transmitted.

According to the OFDM technique, the transmitting side inserts a pilot signal discretely in transmitted signals, the pilot signal being a known signal having a predetermined amplitude and a predetermined phase. The receiving side obtains the frequency characteristic of the transmission channel in use based on the amplitude and phase of the pilot signal so as to equalize the received signal. The pilot signal used in this manner to calculate the transmission channel characteristic is known as the scattered pilot signal (called the SP signal hereunder).

FIG. 2 is a schematic view showing a typical layout pattern of SP signals within OFDM symbols according to the ISDB-T standard. In FIG. 2, the horizontal axis represents subcarrier numbers identifying the subcarriers of an OFDM signal, and the vertical axis denotes OFDM symbol numbers identifying the OFDM symbols of the OFDM signal. The subcarrier numbers correspond to frequencies and the OFDM symbol numbers correspond to time.

In FIG. 2, each hollow circle represents data of the symbol transmitted by each subcarrier, and each solid circle denotes an SP signal. As shown in FIG. 2, an SP signal is placed at intervals of four OFDM symbols in the time direction and at intervals of 12 subcarriers in the frequency direction.

In the case of the ISDB-T standard, a signal called TMCC/AC is placed in each subcarrier. The TMCC/AC signal is designed specifically to transmit a synchronization signal that allows the receiving apparatus to know transmission parameters in effect upon transmission (i.e., information such as the modulation method in use and the encoding ratio in effect) and the symbol number of the symbol in question within an OFDM transmission frame.

In the case of the DVB-T standard, a signal called a TPS signal is inserted. As with the TMCC/AC signal according to the ISDB-T standard, the TPS signal is also formed by a synchronization signal that provides transmission parameters and permits frame synchronization. In this connection, the reader is asked to reference Japanese Patent Laid-Open No. 2005-303440.

SUMMARY OF THE INVENTION

The reception performance of the receiving apparatus is greatly influenced by the accuracy of a symbol synchronization signal that is used to determine the FFT interval during which FFT is carried out. The symbol synchronization signal needs to be adjusted in such a manner as to minimize multipath interference. For example, the adjustment is made so that the boundary position between the GI and the effective symbol shown in FIG. 1 is designated as the start position of an FFT interval.

It is thus preferred that different signals be used to achieve symbol synchronization at different timings and that one of different ways of accomplishing symbol synchronization be optimally selected as needed.

The present invention has been made in view of the above circumstances and provides a receiving apparatus, a receiving method, and a program whereby the manner in which to synchronize OFDM symbols is switched according to the circumstances.

In carrying out the present invention and according to one embodiment thereof, there is provided a receiving apparatus including: first position determination means for calculating correlation values between an OFDM time domain signal constituting an OFDM signal of the time domain representing an OFDM symbol on the one hand, and a signal obtained by delaying the OFDM time domain signal by an effective symbol length on the other hand, in order to determine the start position of an FFT interval which is equal to the effective symbol length and which serves as a signal interval targeted for FFT by an FFT means in reference to the highest of the correlation values; second position determination means for estimating transmission channel characteristics of a known signal included in a first OFDM frequency domain signal constituting an OFDM signal of the frequency domain obtained by performing FFT on the OFDM time domain signal, before interpolating the estimated transmission channel characteristics in the direction of time to obtain transmission channel characteristic estimation data, before performing IFFT on the transmission channel characteristic estimation data to estimate a delay profile, before estimating an inter-symbol interference amount regarding each of a plurality of candidates of the FFT interval based on the delay profile, before determining the start position of that candidate of the FFT interval of which the inter-symbol interference amount is the lowest, as the start position of the FFT interval targeted for FFT by the FFT means; third position determination means for setting another FFT interval in a shifted position relative to the FFT interval used to generate the first OFDM frequency domain signal, before performing FFT on the OFDM time domain signal within that another FFT interval to generate a second OFDM frequency domain signal, before removing distortion from the first and the second OFDM frequency domain signals using the transmission channel characteristics of each of all subcarriers obtained by interpolating the transmission channel characteristic estimation data in the direction of frequency so as to generate an equalized signal, before determining the start position of the FFT interval targeted for FFT by the FFT means based on the quality of the generated equalized signal; selection means for selecting one of those start positions of the FFT interval which are determined by the first through the third position determination means; and the FFT means for performing FFT on the OFDM time domain signal by regarding the start position selected by the selection means as the start position of the FFT interval in order to generate the first OFDM frequency domain signal.

Preferably, the receiving apparatus may further include estimation means for estimating a symbol number of received data based on the first OFDM frequency domain signal; wherein the selection means may select that start position of the FFT interval which is determined by the first position determination means when demodulation is designated to be started, the selection means further selecting that start position of the FFT interval which is selected by the second position determination means in place of the start position selected by the first position determination means when estimation of the symbol number by the estimation means is completed.

Preferably, the receiving apparatus may further include frame synchronization means for synchronizing an OFDM transmission frame made up of a plurality of OFDM symbols on the basis of the first OFDM frequency domain signal; wherein, when the OFDM transmission frame is synchronized by the frame synchronization means, the selection means may select that start position of the FFT interval which is determined by the third position determination means in place of the start position determined by the second position determination means.

Preferably, the first position determination means may determine the position shifted from the highest of the correlation values by a guard interval length, as the start position of the FFT interval targeted for FFT by the FFT means.

Preferably, the second position determination means may estimate the inter-symbol interference amount regarding each of a plurality of paths constituting multipaths, by multiplying that length in the time direction which is interfered with by another symbol when the candidates of the FFT interval are set, by the power of the path being interfered with by that another symbol, and by adding up the products of the multiplications performed on each of the paths.

Preferably, the third position determination means may determine the start position of the FFT interval used to generate the first OFDM frequency domain signal, as the start position of the FFT interval targeted for FFT by the FFT means if the quality of the equalized signal obtained from the first OFDM frequency domain signal is higher than the quality of the equalized signal obtained from the second OFDM frequency domain signal, the third position determination means further determining the start position of that another FFT interval used to generate the second OFDM frequency domain signal, as the start position of the FFT interval targeted for the next FFT by the FFT means if the quality of the equalized signal obtained from the second OFDM frequency domain signal is higher than the quality of the equalized signal obtained from the first OFDM frequency domain signal.

According to another embodiment of the present invention, there is provided a receiving method as well as a program for causing a computer to execute a procedure, each of the method and the procedure including the steps of: causing first position determination means to calculate correlation values between an OFDM time domain signal constituting an OFDM signal of the time domain representing an OFDM symbol on the one hand, and a signal obtained by delaying the OFDM time domain signal by an effective symbol length on the other hand, in order to determine the start position of an FFT interval which is equal to the effective symbol length and which serves as a signal interval targeted for FFT by FFT means in reference to the highest of the correlation values; causing second position determination means to estimate transmission channel characteristics of a known signal included in a first OFDM frequency domain signal constituting an OFDM signal of the frequency domain obtained by performing FFT on the OFDM time domain signal, before interpolating the estimated transmission channel characteristics in the direction of time to obtain transmission channel characteristic estimation data, before performing IFFT on the transmission channel characteristic estimation data to estimate a delay profile, before estimating an inter-symbol interference amount regarding each of a plurality of candidates of the FFT interval based on the delay profile, before determining the start position of that candidate of the FFT interval of which the inter-symbol interference amount is the lowest, as the start position of the FFT interval targeted for FFT by the FFT means; causing third position determination means to set another FFT interval in a shifted position relative to the FFT interval used to generate the first OFDM frequency domain signal, before performing FFT on the OFDM time domain signal within that another FFT interval to generate a second OFDM frequency domain signal, before removing distortion from the first and the second OFDM frequency domain signals using the transmission channel characteristics of each of all subcarriers obtained by interpolating the transmission channel characteristic estimation data in the direction of frequency so as to generate an equalized signal, before determining the start position of the FFT interval targeted for FFT by the FFT means based on the quality of the generated equalized signal; selecting one of those start positions of the FFT interval which are determined by the first through the third position determination means; and performing FFT on the OFDM time domain signal by regarding the selected start position selected as the start position of the FFT interval in order to generate the first OFDM frequency domain signal.

According to an embodiment of the present invention, one of the possible start positions of the FFT interval which have been determined by the first through the third position determination means is selected. FFT is then performed on the OFDM time domain signal using the selected start position as the definitive start position of the FFT interval, and the first OFDM frequency domain signal is generated accordingly.

Parenthetically, the receiving apparatus may be either an independent apparatus or one of the internal blocks of a single apparatus.

Thus the present invention, when embodied as outlined above, allows the way of synchronizing OFDM symbols to be switched according to the circumstances.

BRIEF DESCRIPTION OF THE DRAWINGS

Further advantages of the present invention will become apparent upon a reading of the following description and appended drawings in which:

FIG. 18 is a schematic view showing a relationship between a demodulation FFT interval and a control FFT interval;

FIG. 19 is a schematic view showing another relationship between the demodulation FFT interval and the control FFT interval;

FIG. 22 is a block diagram showing a typical hardware structure of a computer.

DETAILED DESCRIPTION OF THE PREFERRED EMBODIMENT

Overall Structure of the OFDM Receiving Apparatus

Figure 3:
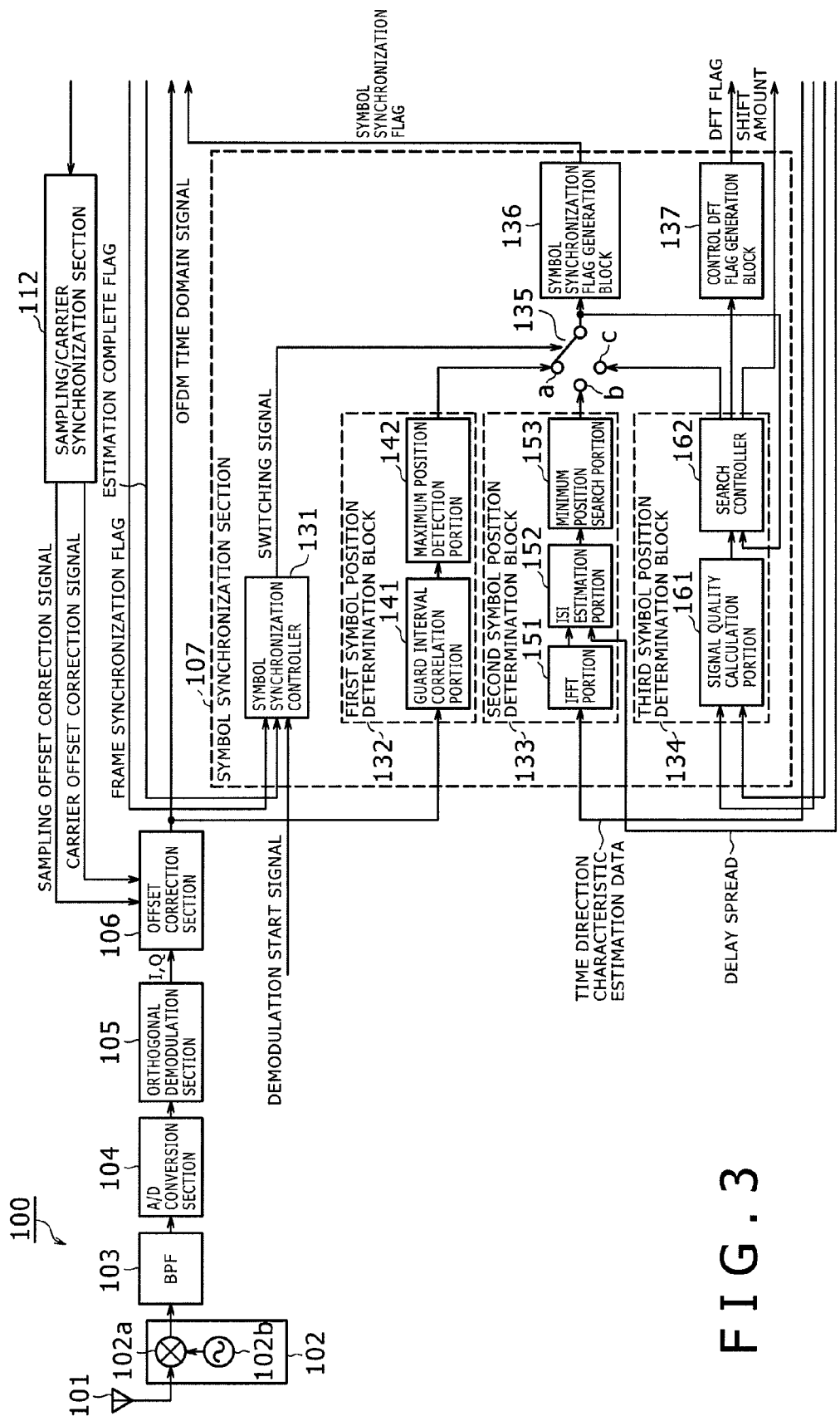
FIG. 3 is a block diagram showing a typical partial structure of an OFDM receiving apparatus.
Figure 4:
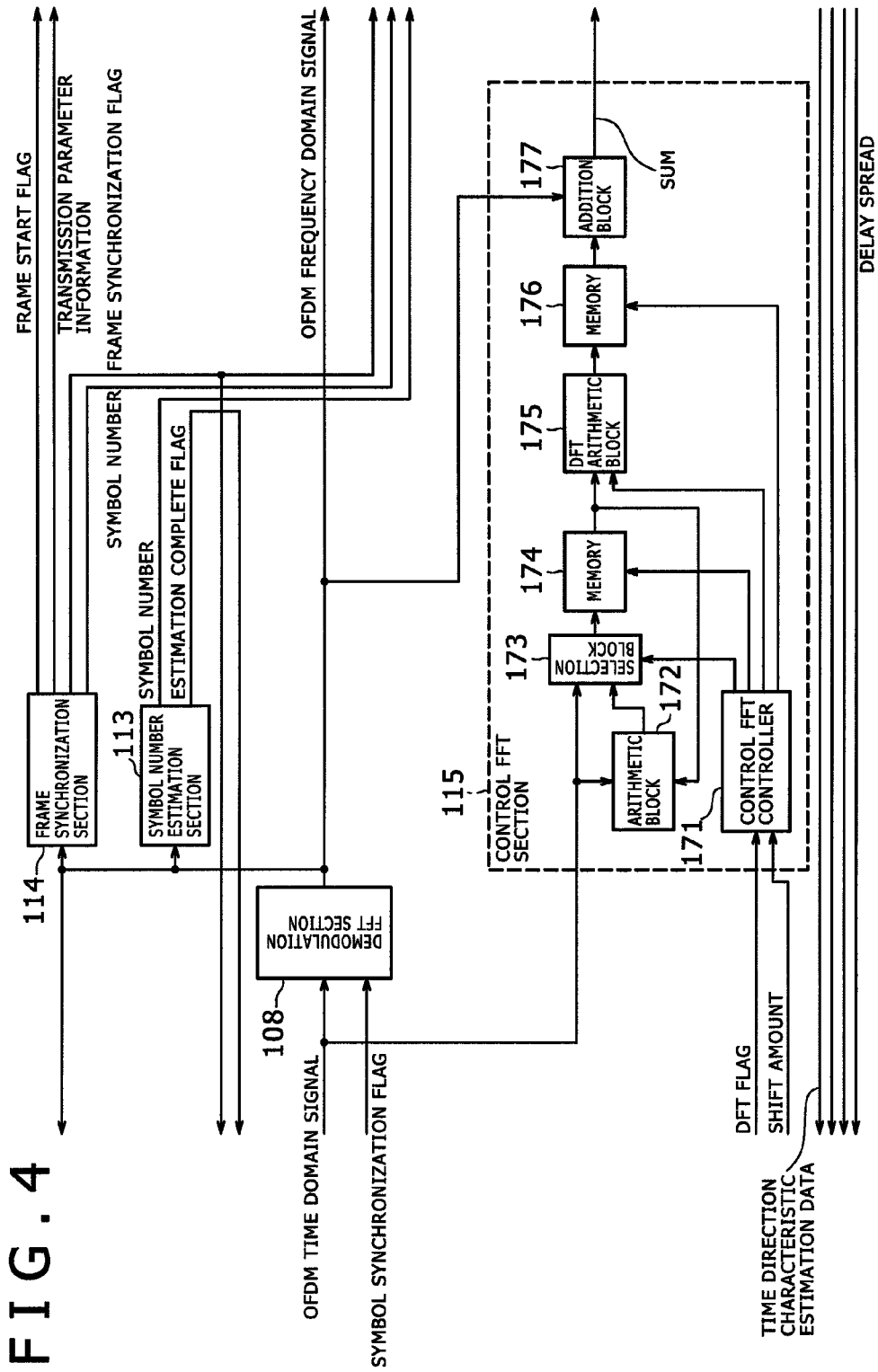
FIG. 4 is a block diagram showing another typical partial structure of the OFDM receiving apparatus.
Figure 5:
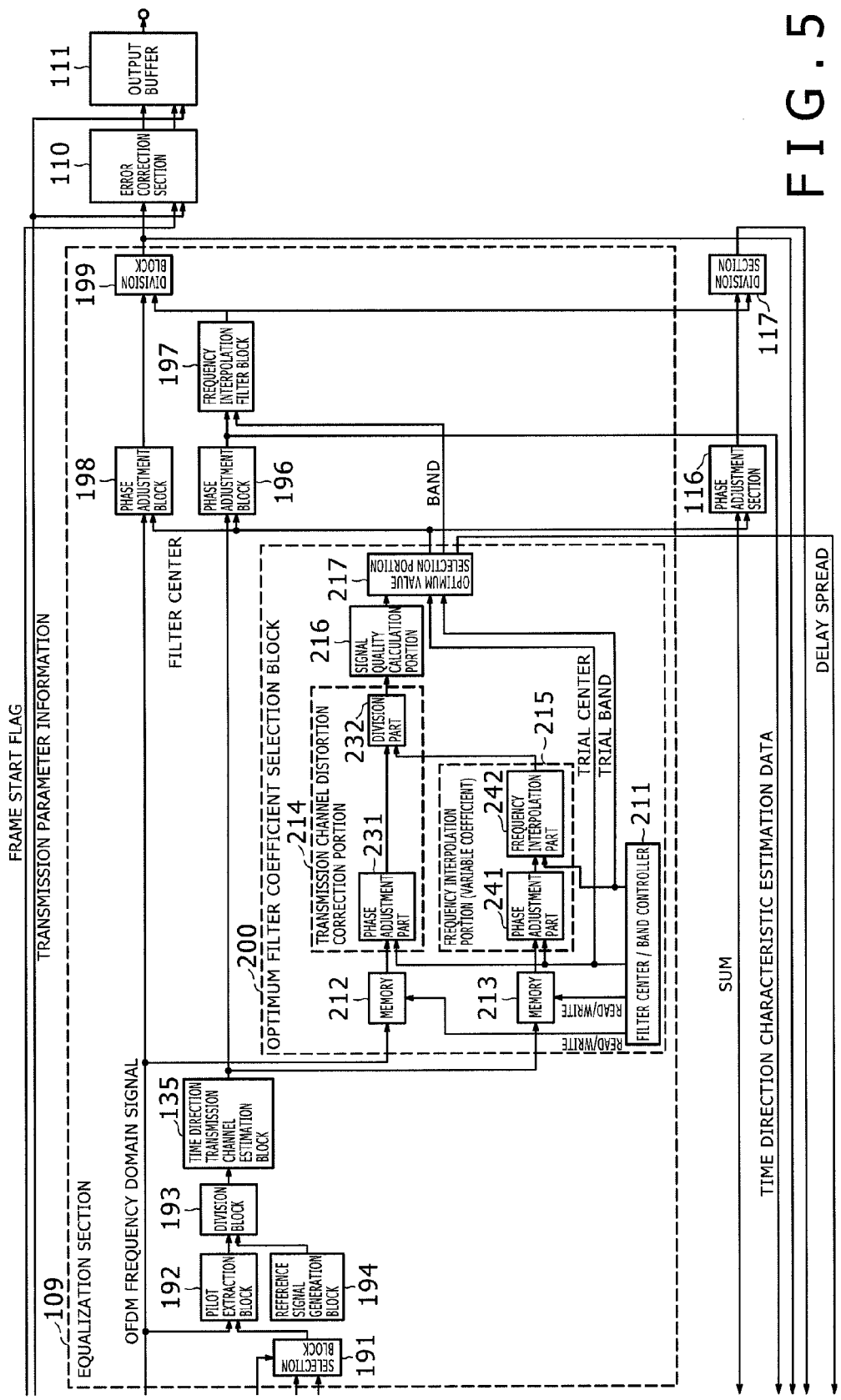
FIG. 5 is a block diagram showing a further typical partial structure of the OFDM receiving apparatus.
Figure 6:
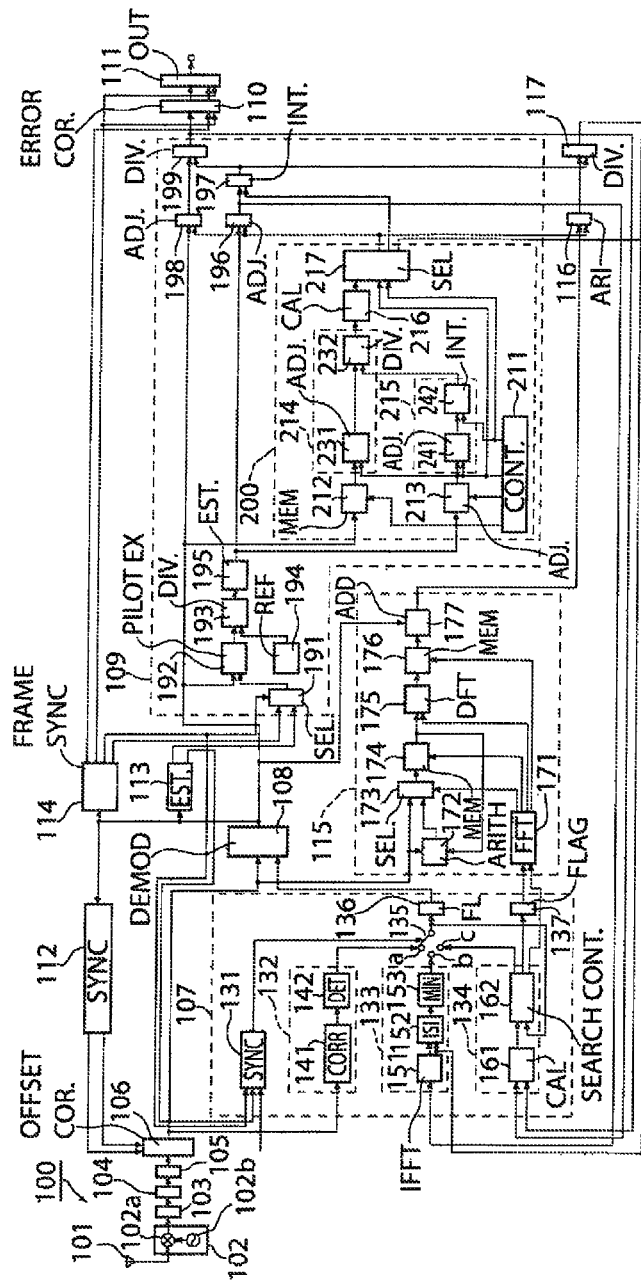
FIG. 6 is a block diagram showing a typical overall structure of the OFDM receiving apparatus.

FIGS. 3 through 5 are block diagrams showing typical structures of an OFDM receiving apparatus 100 practiced as an embodiment of the present invention. FIGS. 3 through 5 each show a partial structure of the OFDM receiving apparatus 100. The connections between these structures are shown integrated in FIG. 6.

An antenna 101 receives the broadcast wave of an OFDM signal transmitted by the transmitting apparatus of a broadcasting station, not shown. The received broadcast wave is output to a tuner 102. The tuner 102 is made up of an arithmetic section 102a and a local oscillator 102b.

The arithmetic section 102a multiplies an RF signal coming from the antenna 101 by a signal from the local oscillator 102b so as to frequency-convert the RF signal into an IF (intermediate frequency) signal. The IF signal is output to a BPF (band pass filter) 103.

The local oscillator 102b generates a sinusoidal signal having a predetermined frequency, and outputs the generated signal to the arithmetic section 102a. The BPF 103 filters the IF signal coming from the tuner 102 and forwards the filtered signal to an A/D conversion section 104.

The A/D conversion section 104 converts the IF signal coming from the BPF 103 from analog to digital form using a carrier of a predetermined frequency, and outputs the digital IF signal to an orthogonal demodulation section 105. The orthogonal demodulation section 105 orthogonally demodulates the IF signal coming from the A/D conversion section 104, and outputs a baseband OFDM signal.

In the ensuing description, the baseband OFDM signal prior to FFT will be referred to as the OFDM time domain signal. The OFDM time domain signal is a complex signal that includes a real axis component (I component) and an imaginary axis component (Q component) resulting from orthogonal demodulation. The OFDM time domain signal output by the orthogonal demodulation section 105 is supplied to an offset correction section 106.

The offset correction section 106 performs various corrections on the OFDM time domain signal coming from the orthogonal demodulation section 105. Illustratively, the offset correction section 106 offsets what is sampled by the A/D conversion section 104 (i.e., corrects sampling timing deviations) based on a sampling offset correction signal supplied by a sampling/carrier synchronization section 112.

Also, the offset correction section 106 offsets the carrier frequency coming from the orthogonal demodulation section 105 (i.e., corrects deviations from the carrier frequency used by the transmitting apparatus) based on a carrier offset correction signal supplied by the sampling/carrier synchronization section 112.

The OFDM time domain signal processed by the offset correction section 106 is fed to a symbol synchronization section 107 as well as to a demodulation FFT section 108 and a control FFT section 115 shown in FIG. 4.

The symbol synchronization section 107 synchronizes OFDM symbols and outputs to the demodulation FFT section 108 a symbol synchronization flag designating the start position of an FFT interval. The demodulation FFT section 108 performs FFT targeted for the signal interval having the same length as an effective symbol length. The start position of the signal interval is designated by the symbol synchronization flag.

The symbol synchronization section 107 selects one of three positions: the position determined based on the OFDM time domain signal prior to FFT, the position determined based on the transmission channel characteristic estimated from the signal having undergone FFT, or the position determined based on an equalized signal. How each of these positions is determined as the start position of the FFT interval will be discussed later in detail. In the ensuing description, the start position of an FFT interval may be simply called the symbol position where appropriate.

Also, the symbol synchronization section 107 outputs a DFT flag to the control FFT section 115. As will be discussed later in detail, the DFT flag is a flag that designates the start position of the signal interval targeted for processing by the control FFT section 115. The control FFT section 115 performs processing equivalent to FFT on an interval shifted by a predetermined amount relative to the FFT interval targeted for processing by the demodulation FFT section 108.

The demodulation FFT section 108 establishes as the FFT interval the interval having an effective symbol length starting from the position designated by the symbol synchronization flag supplied by the symbol synchronization section 107.

Also, the demodulation FFT section 108 extracts an FFT interval signal from the OFDM time domain signal coming from the offset correction section 106, and performs FFT on the extracted FFT interval signal. The FFT operation carried out by the demodulation FFT section 108 provides the data that has been transmitted by subcarriers, i.e., the OFDM signal representing a transmitted symbol on the IQ plane. The output of the demodulation FFT section 108 is given by the following expression (1):

$$Y_{m,k} = H_{m,k} \cdot X_{m,k} + N_{m,k} \qquad (1)$$

where, "Y" stands for the output of the demodulation FFT section 108, subscript "m" for a symbol number, subscript "k" for a carrier number, "H" for the frequency characteristic of the transmission channel in effect, "X" for the transmission signal represented by the signal point of PSK or QAM, and "N" for an item that integrates the interference components stemming from noise components and multipaths.

As described, the signal having undergone FFT is expressed by adding noise and other components to what is obtained by multiplying the transmitted signal by the frequency characteristic of the transmission channel.

The OFDM signal acquired by performing FFT on the OFDM time domain signal is a frequency domain signal. In the ensuing description, the OFDM signal having undergone FFT may be called the OFDM frequency domain signal where appropriate. The OFDM frequency domain signal is supplied to an equalization section 109 (FIG. 5), to the sampling/carrier synchronization section 112, to a symbol number estimation section 113, to a frame synchronization section 114, and to the control FFT section 115.

A selection block 191 in the equalization section 109 selects one of two symbol numbers: the symbol number supplied by the symbol number estimation section 113 (OFDM symbol number), or the symbol number given by the frame synchronization section 114. The symbol number thus selected is output to a pilot extraction block 192.

Figure 1:
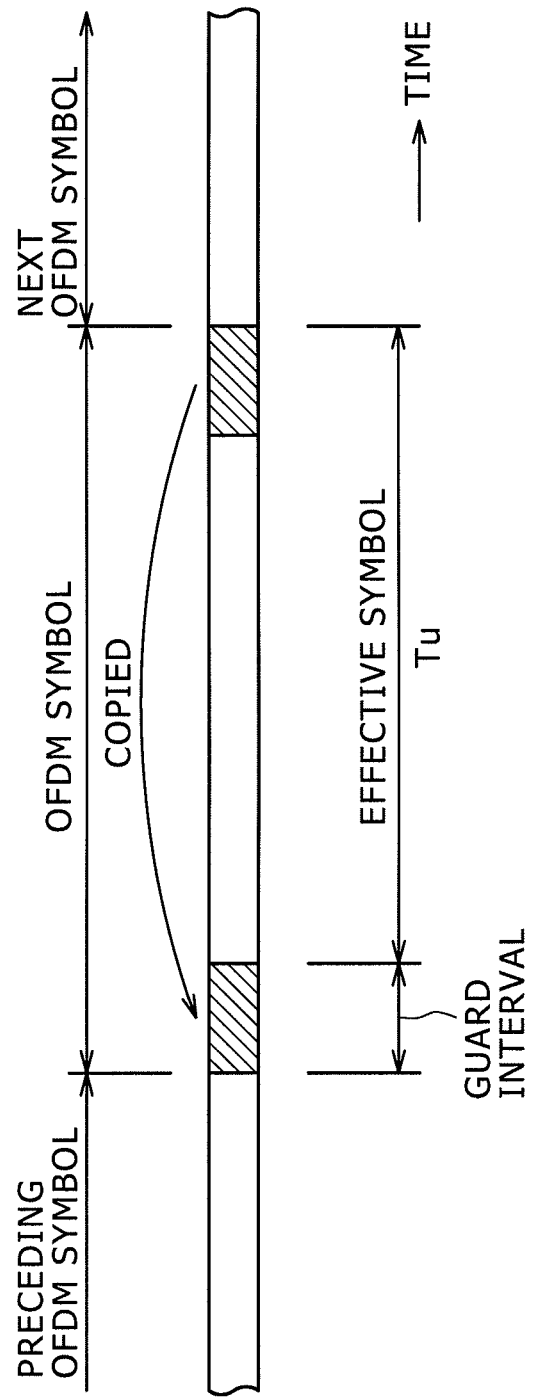
FIG. 1 is a schematic view showing OFDM symbols.
Figure 2:
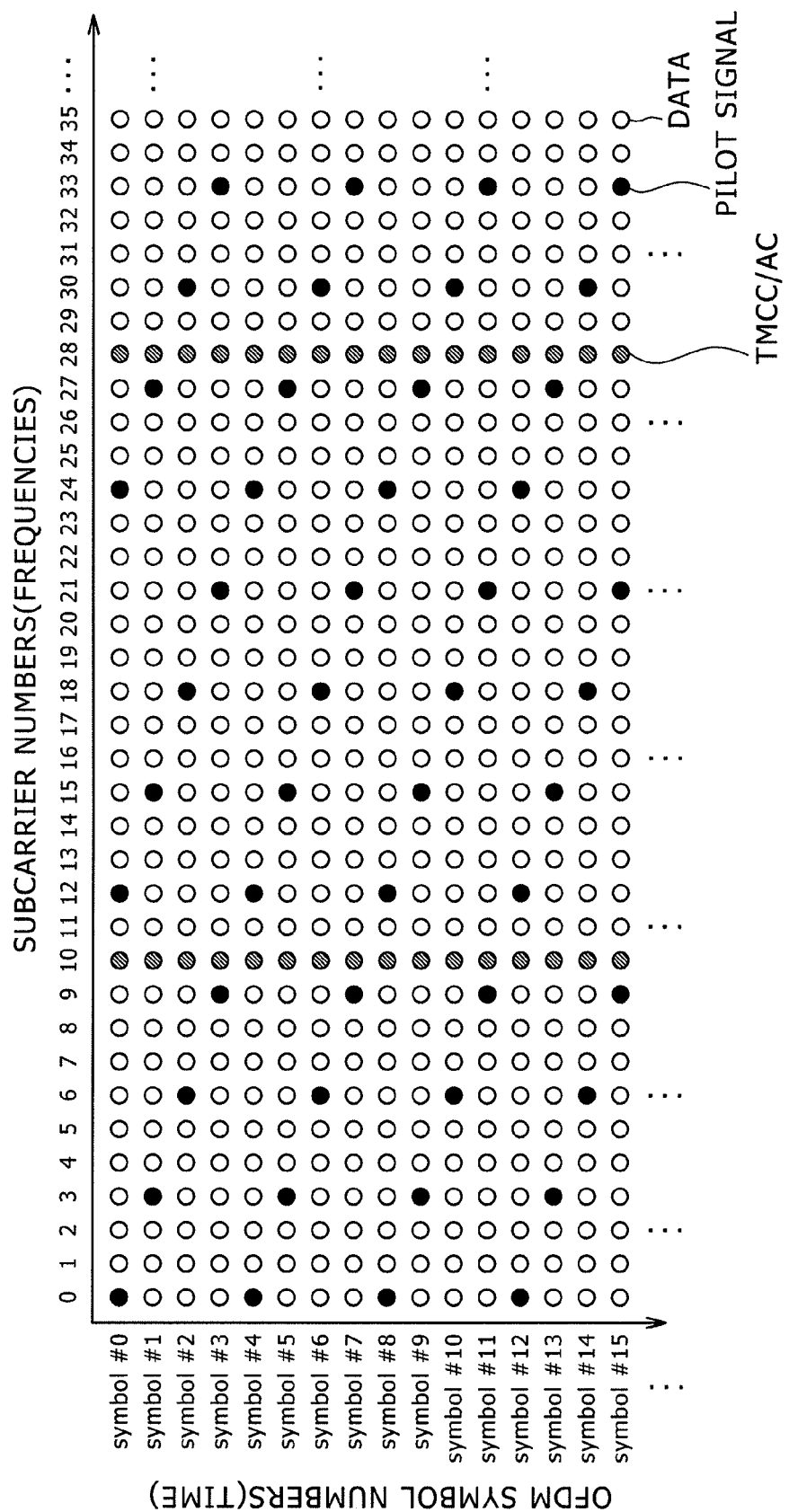
FIG. 2 is a schematic view showing a layout pattern of SP signals.

The pilot extraction block 192 extracts SP signals laid out as shown in FIG. 2. To extract the SP signal requires determining where the currently received data is ranked in order of symbol numbers. The selection block 191 supplies the pilot extraction block 192 with information for determining that ordinal number.

For example, the symbol number supplied by the symbol number estimation section 113 is selected from the time demodulation is started until frame synchronization is completed and a frame synchronization flag is supplied. Following completion of frame synchronization, the symbol number supplied by the frame synchronization section 114 is selected.

In accordance with the symbol number supplied by the selection block 191, the pilot extraction block 192 extracts the SP signal having undergone BPSK modulation from the OFDM frequency domain signal supplied by the demodulation FFT section 108.

For example, if the currently received data has the symbol number 0, that means the SP signal is being transmitted by subcarriers having subcarrier numbers 0, 12 and 24; the pilot extraction block 192 extracts the SP signal accordingly. The pilot extraction block 192 outputs the extracted SP signal to a division block 193.

The division block 193 divides the SP signal coming from the pilot extraction block 192 by a reference signal from a reference signal generation block 194, thereby estimating the transmission channel characteristic of the SP signal.

The transmission channel characteristic value of the SP signal is expressed by the expression (2) given below. A signal X used for obtaining the transmission channel characteristic value is generated by the reference signal generation block 194.

$$\tilde{H}_{n,l} = Y_{n,l}/X_{n,l} = H_{n,l} + (N_{n,l}/X_{n,l}) \qquad (2)$$

where, the symbol "~" indicates that the value to which it is attached is an estimated value. The subscripts "n" and "l" define the position of the SP signal.

The division block 193 outputs transmission channel characteristic data representative of the estimated transmission channel characteristic to a time direction transmission channel estimation block 195. The reference signal generation block 194 generates and outputs the reference signal to be used by the division block 193.

The time direction transmission channel estimation block 195 estimates the transmission channel characteristic of the OFDM symbols arrayed in the time direction of the subcarriers in which SP signals are laid out. The transmission channel characteristic in the time direction is estimated illustratively by use of interpolation or by resorting to an adaptive filter.

The time direction transmission channel estimation block 195 outputs time direction characteristic estimation data representing the transmission channel characteristic at intervals of three subcarriers to a phase adjustment block 196 and an optimum filter coefficient selection block 200.

Figure 7:
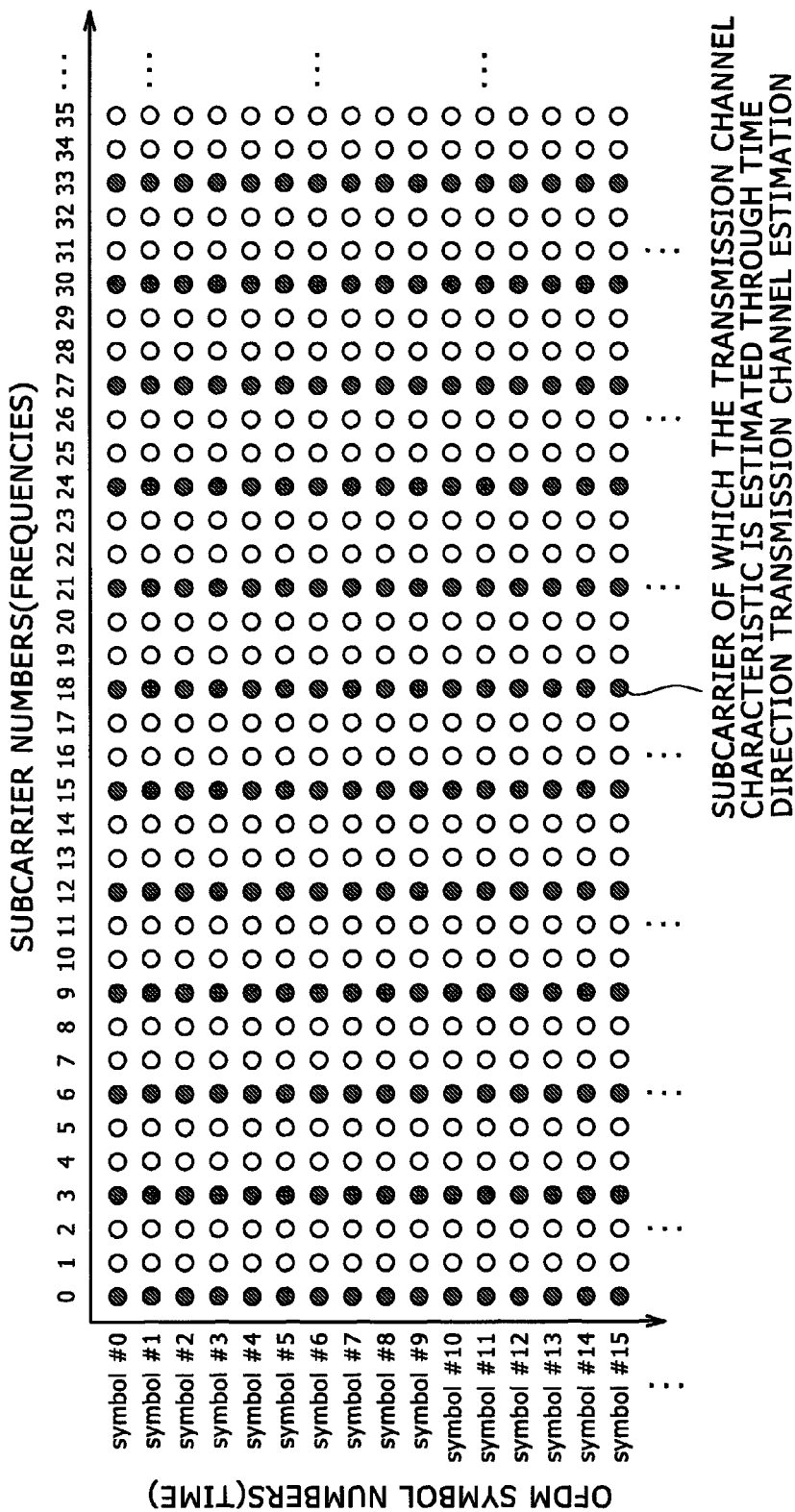
FIG. 7 is a schematic view showing time direction characteristic estimation data.

FIG. 7 is a schematic view showing time direction characteristic estimation data. The time direction characteristic estimation data such as one shown in FIG. 7 is obtained by the time direction transmission channel estimation block 195 using the transmission channel characteristic data regarding the SP signal laid out as shown in FIG. 2. In FIG. 7, hollow and shaded circles each represent a subcarrier (transmitted symbol) of the OFDM signal. The shaded circles each denote the transmitted symbol of which the transmission channel characteristic is estimated following the processing by the time direction transmission channel estimation block 195.

The transmission channel characteristic is estimated in the time direction using the transmission channel characteristic data regarding the SP signal. This permits acquisition of the transmission channel characteristic of each OFDM symbol at intervals of three subcarriers.

The phase adjustment block 196 adjusts the phase of the time direction characteristic estimation data supplied by the time direction transmission channel estimation block 195, in keeping with a filter center supplied by the optimum filter coefficient selection block 200. The phase of the time direction characteristic estimation data is adjusted by rotating a complex signal (with I and Q components) representing a sampled value of the time direction characteristic estimation data, in accordance with the subcarrier number of the subcarrier corresponding to the sampled value and in keeping with the filter center.

The phase adjustment block 196 outputs the phase-adjusted time direction characteristic estimation data to a frequency interpolation filter block 197 and to the symbol synchronization section 107 (FIG. 3).

The frequency interpolation filter block 197 varies the pass band width of an interpolation filter based on the coefficient supplied from the optimum filter coefficient selection block 200 to carry out a frequency interpolation process whereby the transmission channel characteristic is interpolated in the frequency direction. Illustratively, the frequency interpolation filter block 197 interpolates two zeros as newly sampled values between the sampled values of the time direction characteristic estimation data supplied by the time direction transmission channel estimation block 195.

Also, the frequency interpolation filter block 197 uses an LPF (low pass filter) to filter the time direction characteristic estimation data of which the sampled value count is three times that of the initial data, so as to interpolate the transmission channel characteristic in the frequency direction. The pass band width of the LPF (interpolation filter) applied to filtering is adjusted using the coefficient supplied by the optimum filter coefficient selection block 200.

By carrying out filtering using the interpolation filter of which the pass band width is adjusted, the frequency interpolation filter block 197 removes repetitive components attributable to zero interpolation from within the time direction characteristic estimation data. This permits acquisition of the transmission channel characteristic interpolated in the frequency direction.

The frequency interpolation filter block 197 outputs to a division block 199 and a division section 117 the transmission channel characteristic interpolated in the frequency direction, i.e., frequency direction characteristic interpolation data representing the transmission channel characteristic of all subcarriers.

Figure 8:
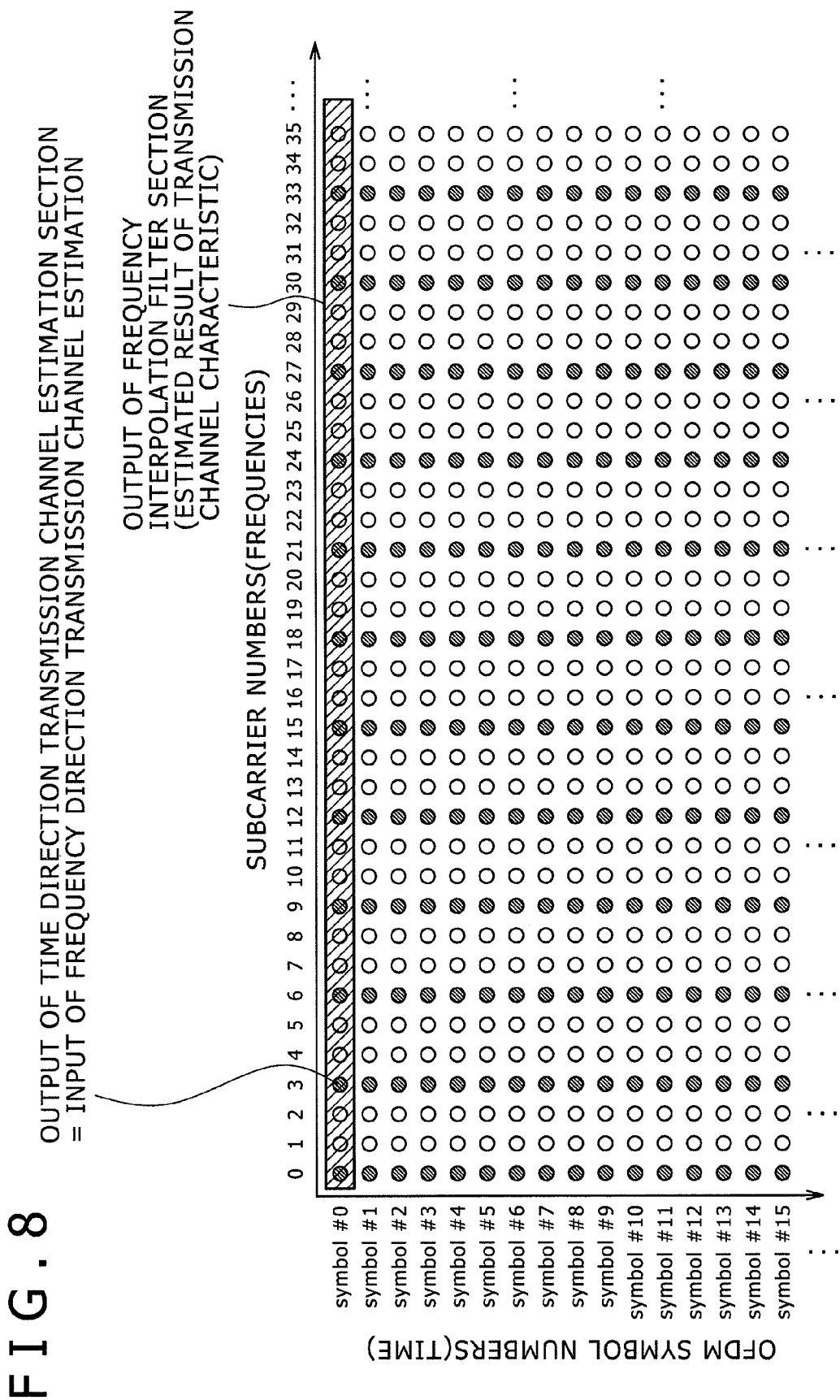
FIG. 8 is a schematic view showing frequency direction characteristic interpolation data.

FIG. 8 is a schematic view showing frequency direction characteristic interpolation data. The frequency interpolation filter block 197 uses the time direction characteristic estimation data representing the transmission channel characteristic at intervals of three subcarriers, so as to obtain the transmission channel characteristic of each of the subcarriers making up the OFDM symbol shown shaded in FIG. 8.

A phase adjustment block 198 adjusts the phase of the OFDM frequency domain signal supplied by the demodulation FFT section 108 in accordance with the filter center supplied by the optimum filter coefficient selection block 200. The phase-adjusted OFDM frequency domain signal is output to the division block 199.

The division block 199 divides the OFDM frequency domain signal coming from the phase adjustment block 198 by a transmission channel estimation value, in order to correct the distortion in amplitude and phase from which the OFDM frequency domain signal suffered over the transmission channel. The OFDM frequency domain signal having undergone the distortion correction is output as an equalized signal.

The distortion that the OFDM signal suffered illustratively as a result of multipaths over the transmission channel acts as a multiplication on the OFDM signal. It follows that the distortion suffered by the OFDM signal over the transmission channel is corrected by dividing the actually received OFDM signal by the transmission channel characteristic. The equalized signal output by the division block 199 is supplied to an error correction section 110 and to the symbol synchronization section 107.

The optimum filter coefficient selection block 200 selects an optimum interpolation filter for use in frequency interpolation processing in accordance with the OFDM frequency domain signal supplied by the demodulation FFT section 108 and on the basis of the time direction characteristic estimation data supplied by the time direction transmission channel estimation block 195.

Illustratively, the optimum filter coefficient selection block 200 tries carrying out frequency interpolation processing under a plurality of conditions through the use of interpolation filters each of which has the width and center position of its pass band varied. Through the processing, the optimum filter coefficient selection block 200 selects the interpolation filter that provides the signal of the highest quality.

Also, the optimum filter coefficient selection block 200 outputs the coefficient representing the pass band width of the selected interpolation filter to the frequency interpolation filter block 197, and outputs information denoting the center position of the pass band of the selected filter to the phase adjustment blocks 196 and 198.

Moreover, the optimum filter coefficient selection block 200 estimates that there exists a delay spread equivalent to the pass band width of the selected interpolation filter, and outputs information to that effect to the symbol synchronization section 107. The optimum filter coefficient selection block 200 will be discussed later in more detail.

The processing by the equalization section 109 involves estimating the value H in the expression (1) shown above using the partially known value X and dividing the value Y by the estimated value H so as to estimate an unknown transmitted signal X. Using the same symbols as those used in the expression (1) earlier, the following expression (3) expresses the equalized signal that is output by the equalization section 109:

$$\tilde{X}_{m,k}=Y_{m,k}/\tilde{H}_{m,k}=(H_{m,k}/\tilde{H}_{m,k})\cdot X_{m,k}+(N_{m,k}/\tilde{H}_{m,k}) \qquad (3)$$

If the estimated value H coincides precisely with the actual transmission channel characteristic H, then the output of the equalization section 109 is expressed by adding to the transmitted signal X what is obtained by dividing the noise item N by the value H.

The error correction section 110 performs a de-interleaving process on the equalized signal coming from the division block 199 of the equalization section 109, and also carries out such processes as depuncture, Viterbi decoding, spread signal removal, and RS decoding. The error correction section 110 outputs to an output buffer 111 the decoded data obtained by performing the diverse processing.

The type of processing performed by the error correction section 110 is switched in accordance with transmission parameter information and a frame start flag supplied by the frame synchronization section 114 shown in FIG. 4. The error correction section 110 makes it possible to acquire transmitted packets (i.e., effective packets) only.

The output buffer 111 inserts ineffective (untransmitted) packets in a predetermined order between the effective packets supplied by the error correction section 110, the packets being forwarded to downstream circuits. The positions in which the ineffective packets have been inserted are determined by the transmission parameter information supplied by the frame synchronization section 114.

The sampling/carrier synchronization section 112 shown in FIG. 3 detects sampling error and carrier error in the amount of phase rotation in the time direction, using the SP and TMCC/AC signals included in the OFDM frequency domain signal supplied by the demodulation FFT section 108.

Also, the sampling/carrier synchronization section 112 filters the detected sampling error and carrier error so as to generate a sampling offset correction signal and a carrier offset correction signal for correction purposes. The sampling/carrier synchronization section 112 outputs the generated correction signals to the equalization section 106.

The symbol number estimation section 113 shown in FIG. 4 estimates the symbol number of the currently received data on the basis of the OFDM frequency domain signal supplied by the demodulation FFT section 108.

As mentioned above, the symbol number estimated by the symbol number estimation section 113 is used to extract SP signals from the time demodulation is started until frame synchronization (of an OFDM transmission frame) is completed.

Because one OFDM transmission frame is made up of 204 OFDM symbols, it will take time to output decoded data if the equalization process cannot be started until frame synchronization is completed. It is for this reason that symbol numbers are estimated by the symbol number estimation section 113 and that the equalization process is started using the estimated symbol numbers.

How symbol numbers are estimated will now be explained in more detail. The symbol number estimation section 113 first receives subcarrier data of a given symbol and then receives subcarrier data of four symbols later.

Regarding each of the initially received symbol data and the subsequently received symbol data, the symbol number estimation section 113 acquires a first correlation value between the data transmitted by subcarriers having the subcarrier numbers 0, 12, 24, etc.

Likewise, with regard to each of the initially received symbol data and the subsequently received symbol data, the symbol number estimation section 113 acquires a second correlation value between the data transmitted by subcarriers having the subcarrier numbers 3, 15, 27, etc.

Also, with respect to each of the initially received symbol data and the subsequently received symbol data, the symbol number estimation section 113 acquires a third correlation value between the data transmitted by subcarriers having the subcarrier numbers 6, 18, 30, etc.

Regarding each of the initially received symbol data and the subsequently received symbol data, the symbol number estimation section 113 then acquires a fourth correlation value between the data transmitted by subcarriers having the subcarrier numbers 9, 21, 33, etc.

The symbol number estimation section 113 compares the first through the fourth correlation values. If the first correlation value is found to be the highest as a result of the comparison, then the symbol number estimation section 113 estimates that the initially received symbol has the symbol number 0 and that the subsequently received symbol has the symbol number 4.

If the second correlation value is found to be the highest, then the symbol number estimation section 113 estimates that the initially received symbol has the symbol number 1 and that the subsequently received symbol has the symbol number 5.

If the third correlation value is found to be the highest, then the symbol number estimation section 113 estimates that the initially received symbol has the symbol number 2 and that the subsequently received symbol has the symbol number 6.

If the fourth correlation value is found to be the highest, then the symbol number estimation section 113 estimates that the initially received symbol has the symbol number 3 and that the subsequently received symbol has the symbol number 7.

That is, as explained above in reference to FIG. 2, the symbol numbers are estimated by taking advantage of the fact that SP signals are spread out at intervals of four OFDM symbols in the time direction and at intervals of 12 subcarriers in the frequency direction.

The symbol number estimation section 113 outputs to the equalization section 109 the estimated symbol number having a modulo-four precision (i.e., precision known by the remainder of division by 4). When the symbol number is estimated, the symbol number estimation section 113 outputs to the symbol synchronization section 107 an estimation complete flag indicating the completion of symbol number estimation.

The frame synchronization section 114 extracts a TMMC signal from the OFDM frequency domain signal supplied by the demodulation FFT section 108, and detects a synchronization byte to generate the symbol number. The frame synchronization section 114 outputs the generated symbol number to the equalization section 109.

Also, when finding the generated symbol number to have reached 204 upon detection of a synchronization byte, the frame synchronization section 114 determines that frame synchronization is complete. At this point, the frame synchronization section 114 outputs a frame synchronization flag indicating the completion of frame synchronization to the symbol synchronization section 107 and equalization section 109.

Furthermore, the frame synchronization section 114 decodes and outputs the transmission parameter information attached in units of an OFDM transmission frame, and outputs a frame start flag indicating the start position of the OFDM transmission frame. The transmission parameter information includes the transmission rate in effect and other information. The transmission parameter information and the frame start flag output by the frame synchronization section 114 are fed to the error correction section 110 and output buffer 111.

The control FFT section 115 performs FFT and equalization on an interval different from the interval targeted for FFT by the demodulation FFT section 108. Illustratively, in carrying out FFT and equalization, the control FFT section 111 adds the result of FFT supplied by the demodulation FFT section 108 to the result of DFT. The sum of the addition performed by the control FFT section 115 constitutes the OFDM frequency domain signal that is supplied to a phase adjustment section 116 shown in FIG. 5. The control FFT section 115 will also be discussed later in more detail.

The phase adjustment section 116 adjusts the phase of the OFDM frequency domain signal coming from the control FFT section 115, in accordance with the filter center supplied by the optimum filter coefficient selection block 200. The phase-adjusted OFDM frequency domain signal is output to the division section 117.

The division section 117 divides the phase-adjusted OFDM frequency domain signal from the phase adjustment section 116 by the transmission channel estimation value supplied by the frequency interpolation filter block 197, thereby correcting the distortion in amplitude and phase which the OFDM frequency domain signal suffered over the transmission channel. The division section 117 outputs to the symbol synchronization section 107 the equalized signal constituted by the OFDM frequency domain signal having undergone distortion correction.

[Structure and Operation of the Symbol Synchronization Section 107]

The symbol synchronization section 107 shown in FIG. 3 will now be explained. The symbol synchronization section 107 is made up of a symbol synchronization controller 131; a first, a second and a third symbol position determination block 132, 133 and 134; a switch 135, a symbol synchronization flag generation block 136, and a control DFT flag generation block 137.

Illustratively, when the power to the OFDM receiving apparatus 100 is turned on, or when channels are switched, a higher-level control section inputs a demodulation start signal designating the start of demodulation to the symbol synchronization controller 131.

The symbol synchronization controller 131 in turn outputs a switching signal to the switch 135. The signal causes the switch 135 to select one of the symbol positions determined by the first, the second and the third symbol position determination blocks 132, 133 and 134.

Illustratively, upon input of the demodulation start signal, the symbol synchronization controller 131 first connects the switch 135 to a terminal "a" in order to select the symbol position determined by the first symbol position determination block 132.

The symbol synchronization flag generation block 136 outputs to the demodulation FFT section 108 a symbol synchronization flag denoting the symbol position determined by the first symbol position determination block 132. The demodulation FFT section 108 sets an FFT interval with reference to the determined symbol position.

The way the symbol position is determined by the first symbol position determination block 132 is based on the OFDM time domain signal prior to FFT.

In order to execute FFT, the demodulation FFT section 108 needs a symbol synchronization flag in reference to which the FFT interval is to be set. It is only after the symbol synchronization flag representing the symbol position determined by the first position determination block 132 is supplied that the demodulation FFT section 108 is enabled to perform FFT.

Being enabled to carry out FFT means becoming able to estimate a symbol number based on the OFDM frequency domain signal. It also means that SP signals can be extracted from the OFDM frequency domain signal based on the estimated symbol number, whereby the transmission channel characteristic can be estimated.

As discussed above, when the symbol number has been estimated, the symbol number estimation section 113 supplies an estimation complete flag to the symbol synchronization controller 131. Upon acquiring time direction characteristic estimation data as representative of the transmission channel characteristic at intervals of three subcarriers, the time direction transmission channel estimation block 195 supplies the acquired time direction characteristic estimation data to the second symbol position determination block 133.

Upon receipt of an estimation complete flag indicating that the symbol number has been estimated from the symbol number estimation section 113, the symbol synchronization controller 131 proceeds to connect the switch 135 to a terminal "b" so as to select the symbol position determined by the second symbol position determination block 133.

The symbol synchronization flag generation block 136 outputs to the demodulation FFT section 108 a symbol synchronization flag indicating the symbol position determined by the second symbol position determination block 133. The demodulation FFT section 108 sets an FFT interval with reference to the determined symbol position.

The way the symbol position is determined by the second symbol position determination block 133 is based on the time direction characteristic estimation data acquired from the OFDM frequency domain signal having undergone FFT. It is only after the time direction characteristic estimation data is supplied that the symbol position can be determined in this manner.

That the time direction characteristic estimation data can be obtained means it is possible to interpolate the time direction characteristic estimation data in the frequency direction and to correct the distortion included in the OFDM frequency domain signal by use of the transmission channel characteristic of all subcarriers.

After correction of the distortion over the transmission channel, the division block 199 and the division section 117 shown in FIG. 5 supply an equalized signal to the third symbol position determination block 134.

When supplied with a frame synchronization flag by the frame synchronization section 114 upon completion of frame synchronization, the symbol synchronization controller 131 proceeds to connect the switch 135 to a terminal "c" so as to select the symbol position determined by the third symbol position determination block 134.

The symbol synchronization flag generation block 136 outputs to the demodulation FFT section 108 a symbol synchronization flag indicating the symbol position determined by the third symbol position determination block 134. The demodulation FFT section 108 sets an FFT interval with reference to the determined symbol position.

The way the symbol position is determined by the third symbol position determination block 134 is based on the equalized signal acquired by correcting the distortion over the transmission channel. It is only after the equalized signal is supplied that the symbol position can be determined in this manner.

The symbol synchronization controller 131 connects the switch 135 to a terminal "c" so as to select the symbol position determined by the third symbol position determination block 134. This state is maintained until another demodulation start signal is input.

The preceding description has shown how one of three symbol positions is suitably selected and output: the symbol position determined by the first symbol position determination block 132, the symbol position determined by the second symbol position determination block 133, and the symbol position determined by the third symbol position determination block 134.

In the description that follows, the way the first symbol position determination block 132 determines the symbol position will be called the first determination method, the way the second symbol position determination block 133 determines the symbol position will be called the second determination method, and the way the third symbol position determination block 134 determines the symbol position will be called the third determination method.

The second determination method involves determining the position in which inter-symbol interference is minimal as the symbol position, as will be explained later. It follows that the second determination method provides better reception performance than the first determination method whereby the symbol position is determined based on the OFDM time domain signal.

The third determination method involves determining the position in which the quality of the actual equalized signal is optimized as the symbol position, as will be discussed later. It follows that the third determination method provides better reception performance than the second determination method whereby the symbol position is determined based on the time direction characteristic estimation data.

Under control of the symbol synchronization controller 131, reception performance becomes basically better the longer the time that elapses from the start of demodulation. The first through the third determination methods will be discussed later in more detail.

The symbol synchronization flag generation block 136 outputs to the demodulation FFT section 108 a symbol synchronization flag denoting the symbol position supplied by way of the switch 135.

Based on the symbol position supplied by the third symbol position determination block 134, the control DFT flag generation block 137 generates a DFT flag designating the start position of the interval targeted for processing by the control FFT section 115. The DFT flag thus generated is output to the control FFT section 115.

Figure 9:
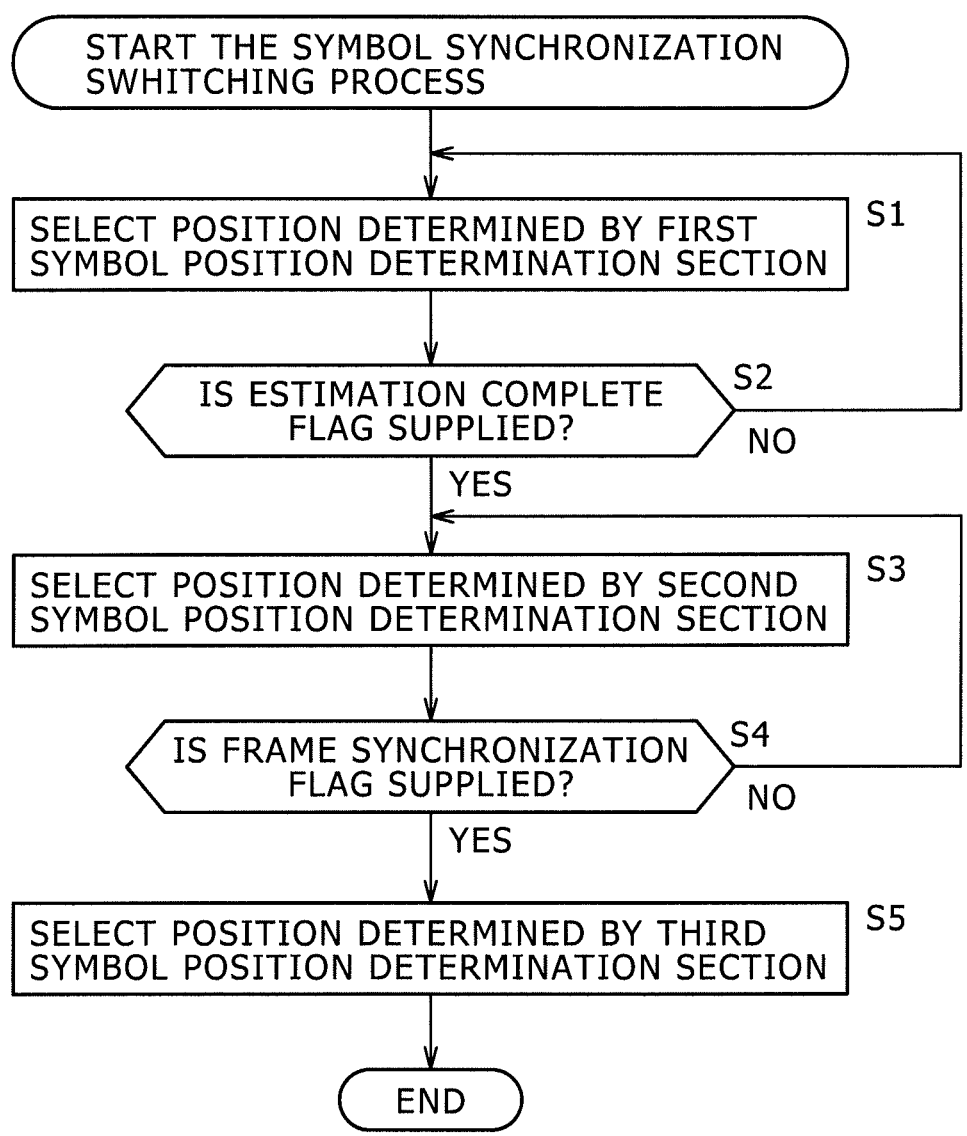
FIG. 9 is a flowchart explanatory of a switching process performed by a symbol synchronization controller.

Described below in reference to the flowchart of FIG. 9 is the switching process carried out by the symbol synchronization controller 131. This process is started when a demodulation start signal is input.

In step S1, the symbol synchronization controller 131 connects the switch 135 to the terminal "a" so as to select the symbol position determined by the first symbol position determination block 132. A symbol synchronization flag indicating the symbol position determined by the first symbol position determination block 132 is output to the demodulation FFT section 108. An FFT section is then set up with reference to the start position thus determined.

In step S2, the symbol synchronization controller 131 determines whether an estimation complete flag is supplied by the symbol number estimation section 113. If in step S2 no estimation complete flag is found to be received, then the symbol synchronization controller 131 returns to step S1 and selects continuously the symbol position determined by the first symbol position determination block 132.

If in step S2 an estimation complete flag is found to be received, then step S3 is reached. In step S3, the symbol synchronization controller 131 connects the switch 135 to the terminal "b" so as to select the symbol position determined by the second symbol position determination block 133. A symbol synchronization flag indicating the symbol position determined by the second symbol position determination block 133 is output to the demodulation FFT section 108. An FFT section is then set up with reference to the start position thus determined.

In step S4, the symbol synchronization controller 131 determines whether a frame synchronization flag is supplied by the frame synchronization section 114. If in step S4 no frame synchronization flag is found to be received, then the symbol synchronization controller 131 returns to step S3 and selects continuously the symbol position determined by the second symbol position determination block 133.

If in step S4 a frame synchronization flag is found to be received, then step S5 is reached. In step S5, the symbol synchronization controller 131 connects the switch 135 to the terminal "c" so as to select the symbol position determined by the third symbol position determination block 134. A symbol synchronization flag indicating the symbol position determined by the third symbol position determination block 134 is output to the demodulation FFT section 108. An FFT section is then set up with reference to the start position thus determined.

The process described above is carried out every time a demodulation start signal is input.

The point in time at which to operate the switch 135 to output the symbol position determined by the third symbol position determination block 134 is not limited to when the frame synchronization flag is supplied upon completion of frame synchronization. Alternatively, the time period having elapsed since the start of demodulation may be counted by a timer, and the switch 135 may then be operated upon elapse of a relatively long time period (since the start of demodulation) equivalent to the time it takes to complete frame synchronization.

[First Determination Method]

Explained below is the first determination method by which the first symbol position determination block 132 determines the symbol position. As shown in FIG. 3, the first symbol position determination block 132 is made up of a guard interval correlation portion 141 and a maximum position detection portion 142.

Figure 10:
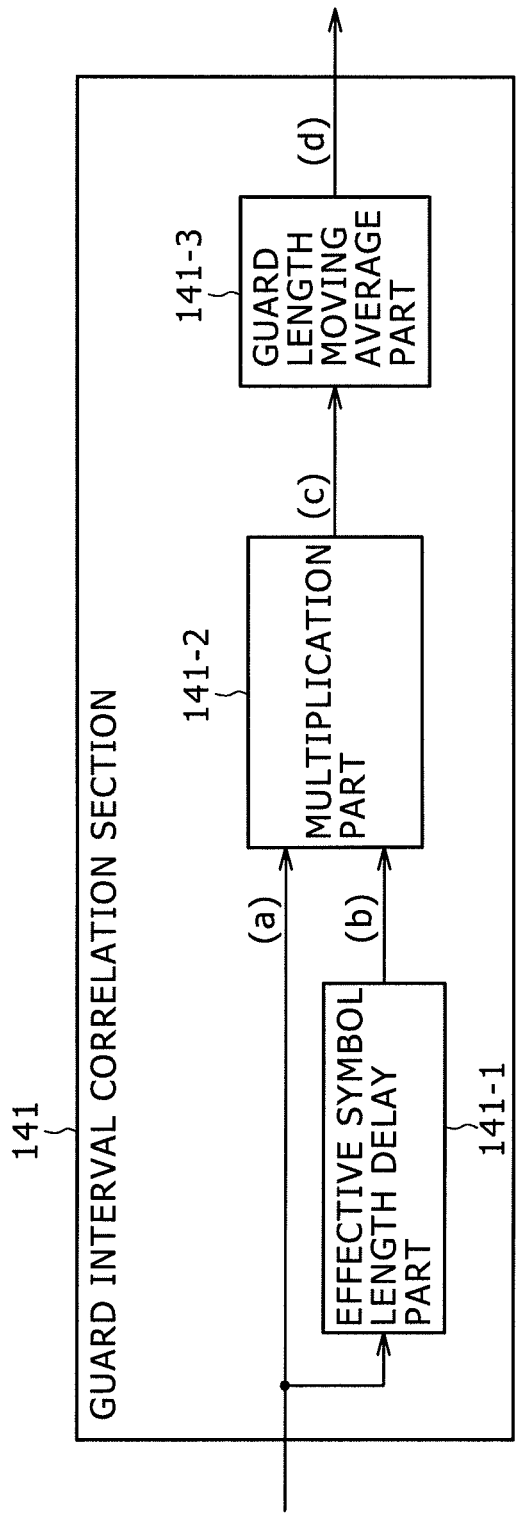
FIG. 10 is a block diagram showing a typical structure of a guard interval correlation section.

FIG. 10 is a block diagram showing a typical structure of the guard interval correlation portion 141. The OFDM time domain signal supplied by the offset correction section 106 is input to an effective symbol length delay portion 141-1 and a multiplication portion 141-2. The effective symbol length delay portion 141-1 delays the OFDM time domain signal by an effective symbol length and outputs a delayed OFDM time domain signal to the multiplication portion 141-2.

Figure 11:
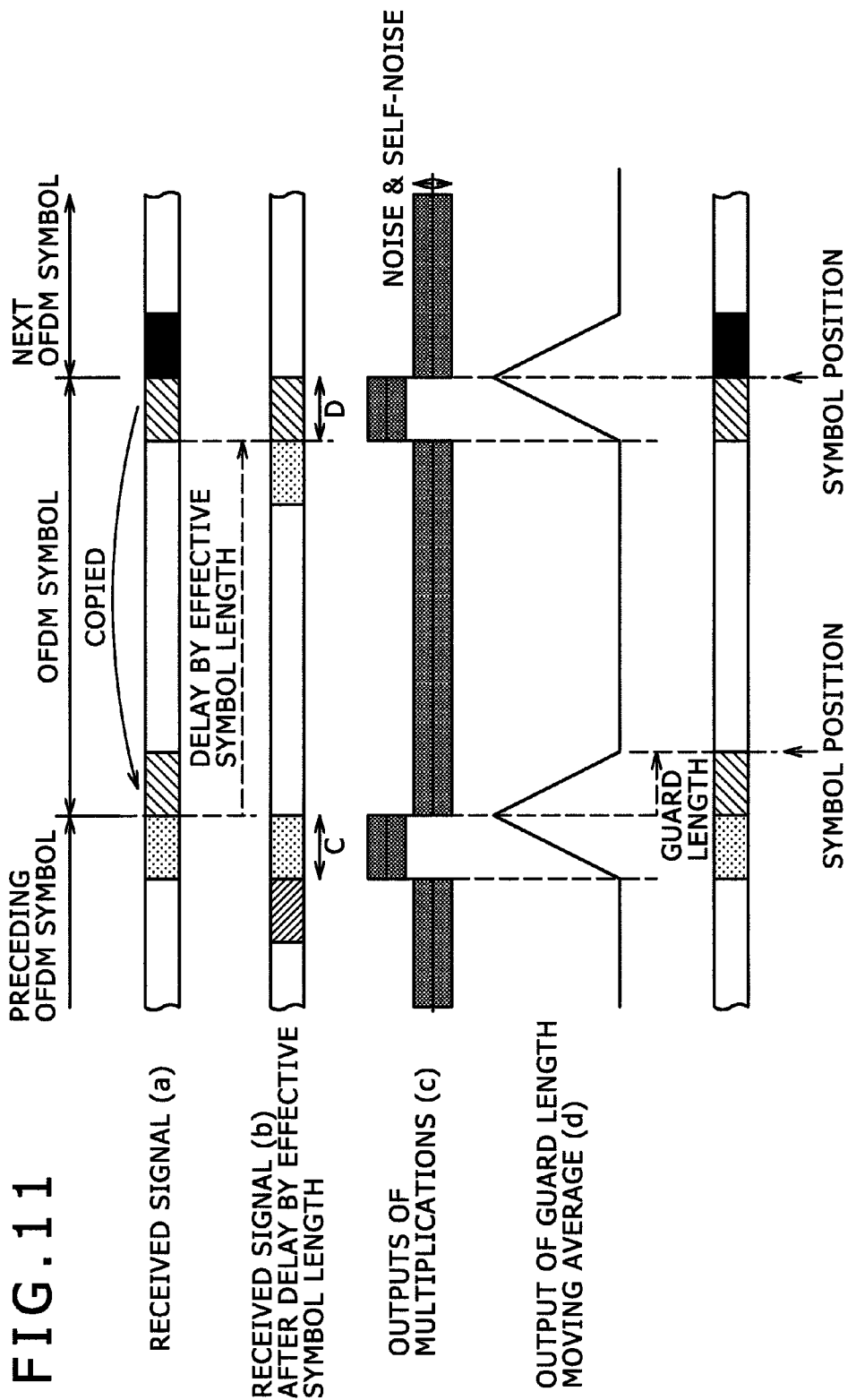
FIG. 11 is a schematic view showing typical signals handled by the sections indicated in FIG. 10.

FIG. 11 is a schematic view showing typical signals handled by the sections indicated in FIG. 10. Where the OFDM time domain signal is input to the guard interval correlation portion 141 as a received signal (a) shown at the top of FIG. 11, the effective symbol length delay portion 141-1 outputs another received signal (b) shown second from the top. The horizontal direction in FIG. 11 represents the direction of time.

The multiplication portion 141-2 multiplies the OFDM time domain signal coming from the offset correction section 106 by an OFDM time domain signal which is delayed by the effective symbol length delay portion 141-1 and which is input at the same time.

With multipath interference and noise not taken into consideration, a GI (guard interval) signal, one of 1-symbol signals, is identical to the signal of the interval from which the GI signal was copied. The signal of the interval from which the GI signal was copied in the input OFDM time domain signal has the same timing as the GI signal in the delayed OFDM time domain signal. The average of the results from the multiplications of these interval signals amounts to a predetermined non-zero value.

The outputs of multiplications (c) shown third from the top in FIG. 11 represent the outputs of the multiplication portion 141-2. The results of multiplications output by the multiplication portion 141-2 are supplied to a guard length moving average portion 141-3.

The guard length moving average portion 141-3 obtains a moving average, over the same length as the GI length, of the outputs which come from the multiplication portion 141-2 and which are shown third from the top in FIG. 11. The moving average thus obtained is output to the maximum position detection portion 142 in FIG. 3. The output of the guard length moving average portion 141-3 constitutes a sequence of which the maximum value occurs at symbol boundaries as shown fourth from the top in FIG. 11.

The maximum position detection portion 142 detects positions in which occurs the maximum value of the sequence representative of the moving average supplied by the effective symbol length delay portion 141-1. As shown at the bottom of FIG. 11, the maximum position detection portion 142 then determines the position subsequent to the maximum-value position by the GI length, as the symbol position. The maximum position detection portion 142 proceeds to output the symbol position thus determined to the switch 135.

As described above, the first symbol position determination block 132 determines the symbol position by taking advantage of the fact that a given GI signal is identical to the signal of the interval from which the GI signal in question was copied.

Explained below are the reasons why the first determination method needs to be replaced by the second and the third determination methods in a suitably timed manner.

According to the first determination method, the path with the highest power may be regarded as the main path, and the symbol position of the main path may then be detected. However, in a multipath environment in which an echo precedes the incoming main path, the position of the preceding echo needs to be detected in order to find the symbol position without ISI (inter-symbol interference).

Figure 12:
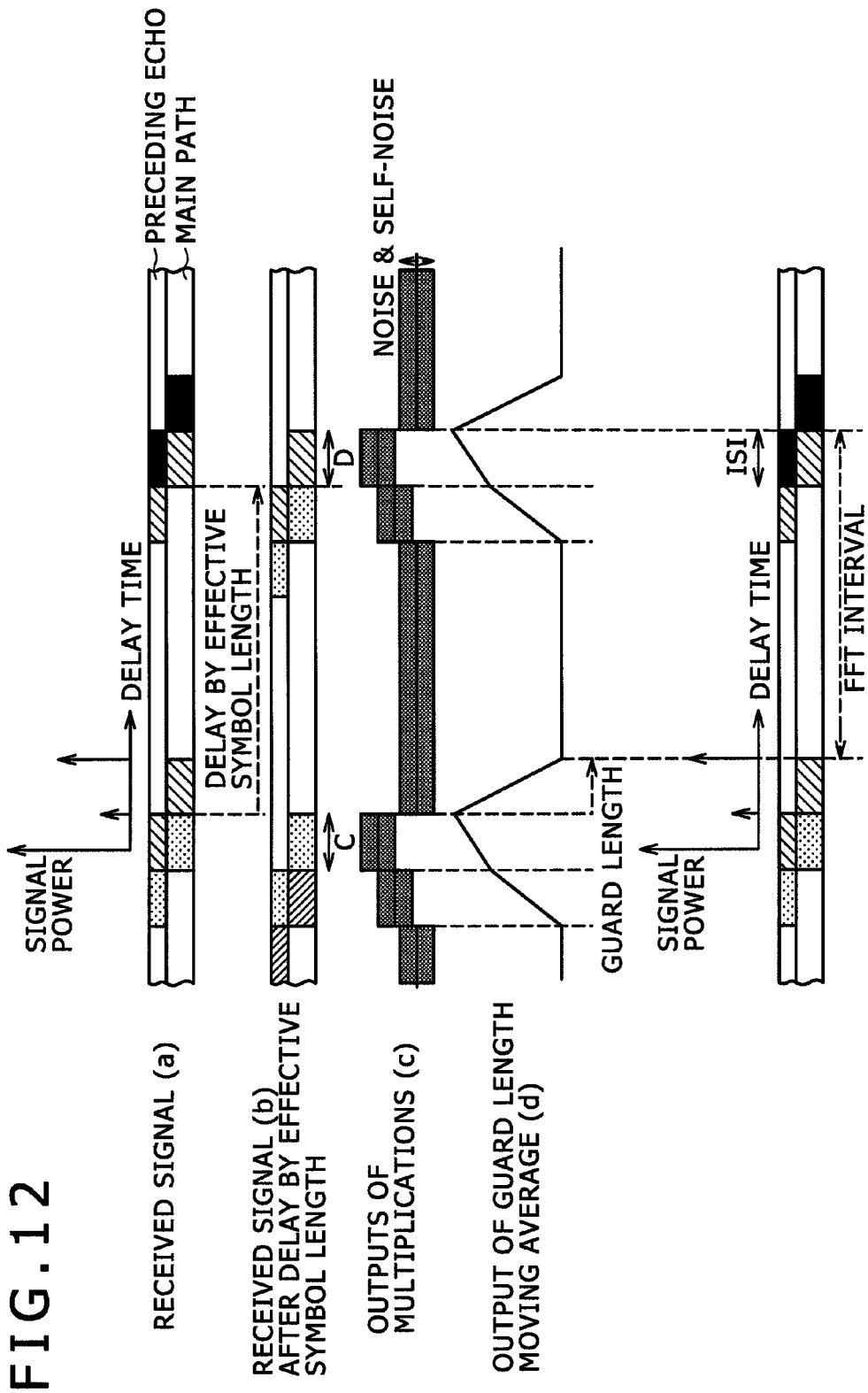
FIG. 12 is a schematic view explanatory of a multipath environment.

The multipath environment in which the preceding echo exists is explained below in reference to FIG. 12. Illustratively, suppose that there is a multipath environment shown as a received signal (a) at the top of FIG. 12. In this example, the arrival time of the preceding echo precedes the arrival time of the main path by approximately the same time period as that of a GI.

In that environment, the received signal (a) is multiplied by a delayed received signal (b) and, in a sequence of moving averages, the position subsequent to the maximum-value position by the GT length is regarded as the symbol position. In this case, as shown at the bottom of FIG. 12, the FFT interval includes the signal of the symbol next to the target symbol and may well develop an ISI.

As described, in the multipath environment where the preceding echo exists and where delay spread is longer than the GI length, an ISI will be caused if the first determination method is applied. It is then required to detect the position where the ISI is minimal, but the first determination method has difficulty meeting that requirement.

[Second Determination Method]

Explained below is the second determination method by which the second symbol position determination block 133 determines the symbol position. As shown in FIG. 3, the second symbol position determination block 133 is made up of an IFFT portion 151, an ISI estimation portion 152, and a minimum position search portion 153.

The IFFT portion 151 estimates a delay profile by performing IFFT on the time direction characteristic estimation data which is supplied by the phase adjustment block 196 shown in FIG. 5 and which represents the transmission channel characteristic at intervals of three subcarriers. The delay profile thus estimated is output to the ISI estimation portion 152.

In this example, the time direction characteristic estimation data having undergone phase adjustment is input and processed. This process, however, is equivalent to the process involving the data prior to phase adjustment.

The ISI estimation portion 152 estimates the amount of ISI by filtering the delay profile estimated by the IFFT portion 151, and outputs the estimated amount of ISI to the minimum position search portion 153. The shape of the filter used for filtering is determined using the information about delay spread supplied by the optimum filter coefficient selection block 200 shown in FIG. 5.

The minimum position search portion 153 detects as the symbol position the position in which the amount of ISI obtained through filtering is minimum, and outputs the symbol position thus detected.

Figure 13:
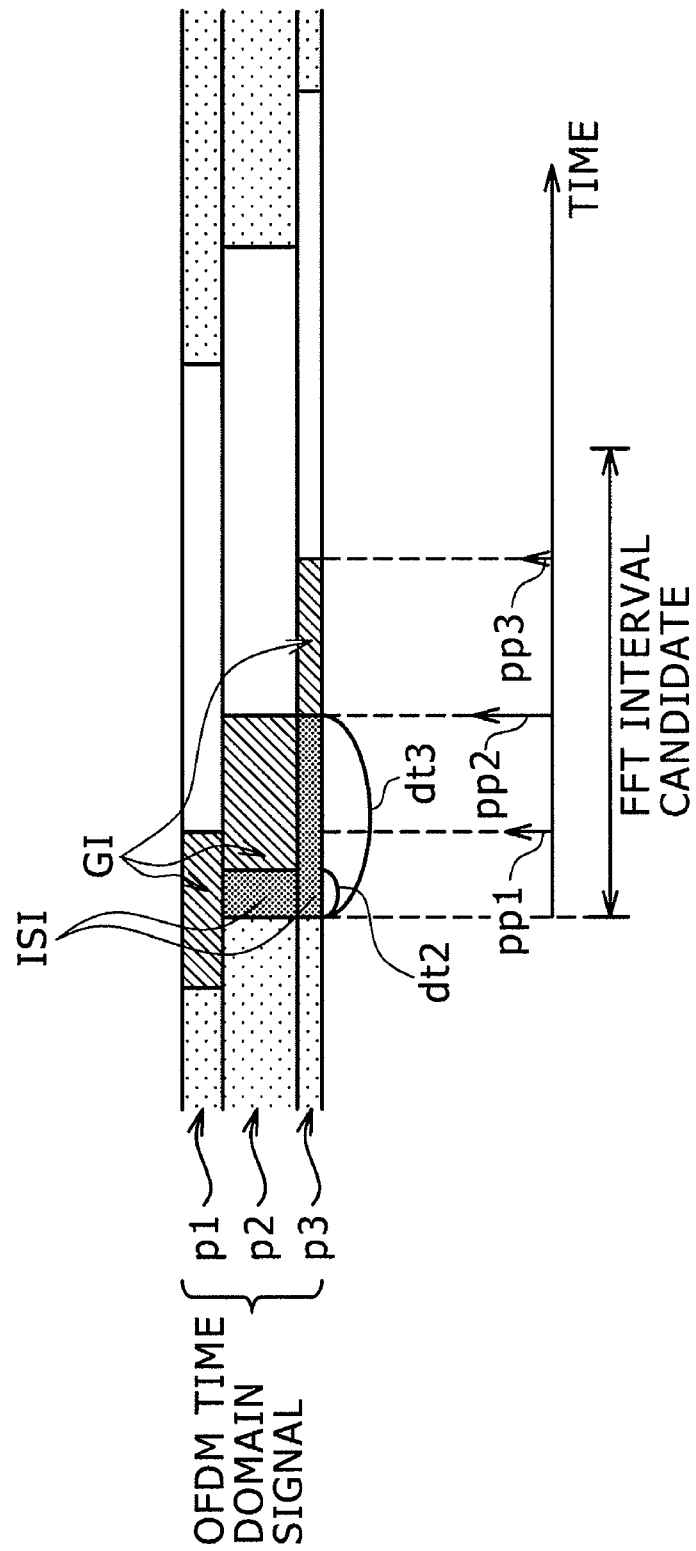
FIG. 13 is a schematic view explanatory of how an ISI amount is estimated.

How the amount of ISI is estimated by the ISI estimation portion 152 will now be described. FIG. 13 is a schematic view explanatory of how the ISI amount is typically estimated.

It is assumed here that there are three paths p1, p2 and p3 as shown in FIG. 13. The horizontal direction in FIG. 13 denotes the direction of time. In the upper part of FIG. 13, the width of each of the bands representing the paths represents the power of the path in question.

Shown in the lower part of FIG. 13 is a delay profile estimated by the IFFT portion 151. Portions pp1 through pp3 are shown to denote the levels of power of the paths p1 through p3. The power of each of the paths is also determined by the delay profile.

Where a given interval is set up as the FFT interval, the ISI amount is obtained by multiplying the length, in the time direction, of the interval where an ISI is taking place, by the power of the path on which the ISI is occurring, and by adding up the results of the multiplications on all paths.

For example, if an FFT interval such as one shown in FIG. 13 is set up, then an ISI occurs between the path p2 and the path p3. The amount of the ISI is expressed by dt2×pp2+dt3×pp3, where dt2 denotes the length, in the time direction, of the interval of the path p2 on which the ISI is taking place, and dt3 represents the length, in the time direction, of the interval of the path p3 where the ISI is occurring. The ISI estimation portion 152 carries out the filtering process to obtain the same result as that of the above calculations.

Figure 14:
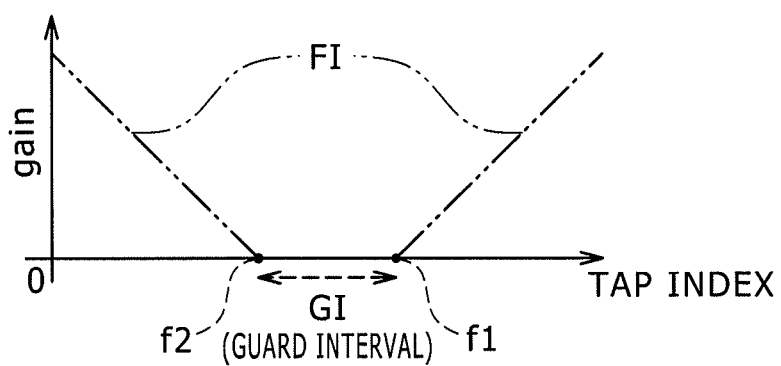
FIG. 14 is a schematic view showing a typical ISI estimation filter.

FIG. 14 is a schematic view showing a typical ISI estimation filter used to estimate the ISI amount. In FIG. 14, the vertical axis represents filter coefficients (gain) and the horizontal axis denotes the degrees of tap index.

The ISI estimation filter FI in FIG. 14 is shaped in such a manner that the gain is zero during a tap index interval of which the length corresponds to that of a GI. It is also possible to make the length of the interval where the gain is zero correspond to the length of the delay spread supplied by the optimum filter coefficient selection block 200.

Furthermore, the ISI estimation filter FI is shaped in such a manner that the gain increases in an interval subsequent to a position f1 at the rear end of the zero-gain interval and in proportion to the distance from that position f1, and that the gain also increases in an interval earlier than a position f2 at the front end of the zero-gain interval and in proportion to the distance from that position f2. The gradient of the straight line defining the gain of the interval subsequent to the position f1 may be discretionary, and so may be the gradient of the straight line defining the gain of the interval earlier than the position f2.

Figure 15:
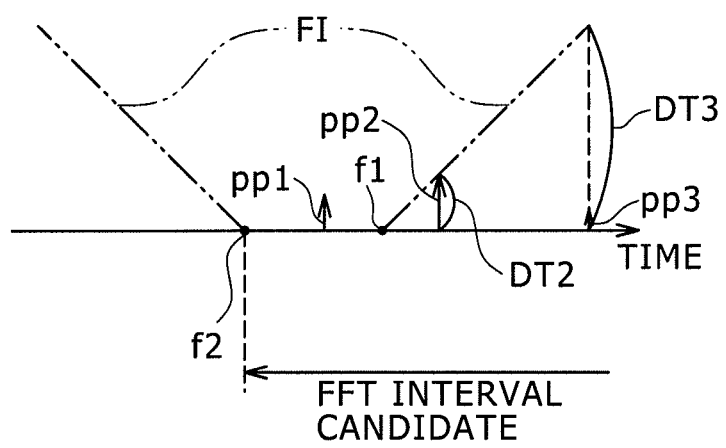
FIG. 15 is a schematic view showing a delay profile and an ISI estimation filter overlapping with one another.

FIG. 15 is a schematic view showing the delay profile of FIG. 13 and the ISI estimation filter FI of FIG. 14 overlapping with one another. As shown in FIG. 15, when a given interval is set up as an FFT interval candidate, the ISI estimation filter FI is established in such a manner that the start position of the FFT interval in question coincides with the front-end position f2 of a zero-gain interval.

In that case, the path p1 is within the zero-gain interval, so that the power pp1 of the path p1 is multiplied by zero. The path p2 is positioned subsequent to the rear-end position f1 of the zero-gain interval, so that the power pp2 of the path p2 is multiplied by a predetermined gain DT2. The path p3 is also positioned subsequent to the position f1, so that the power pp3 of the path p3 is multiplied by a gain DT3 which is higher than the gain DT2.

The ISI estimation portion 152 adds up the results of the multiplications to obtain an estimated ISI amount. The operations carried out by the ISI estimation portion 152 as the filtering process are defined by the following expression (4):

$$ISI \text{ amount} = \sum_{n=0}^{NN-1} (\text{path power} \times \text{filter coefficient}) \quad (4)$$

where, NN denotes the sample size of all data subsequent to IFFT (i.e., number of IFFT points).

The ISI estimation portion 152 performs the filtering process above a plurality of times by shifting the position of the FFT interval candidate by a predetermined width (i.e., by shifting the position of the ISI estimation filter FI by a predetermined width).

Figure 16A:
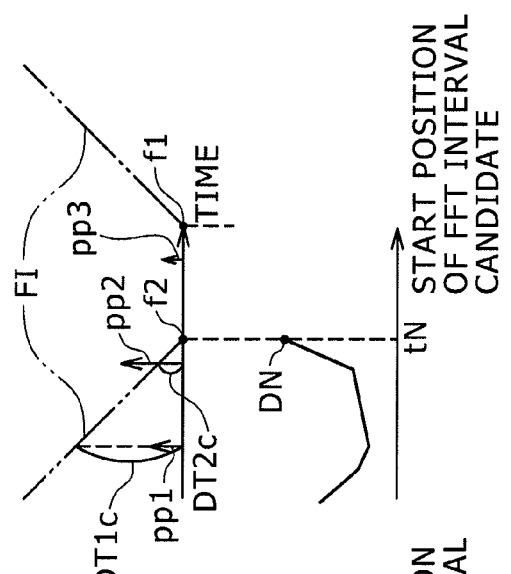
FIGS. 16A, 16B and 16C are schematic views showing typical results from the filtering process.
Figure 16B:
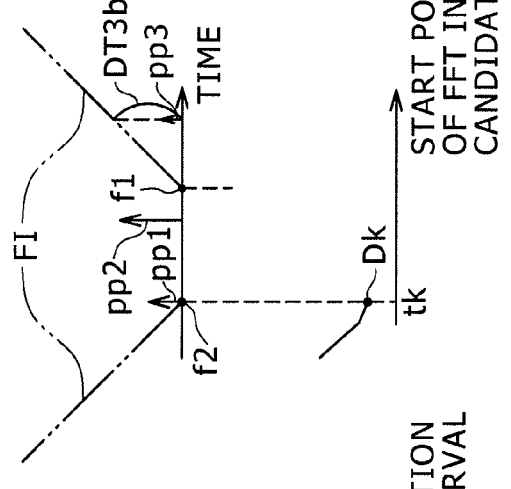
Figure 16C:
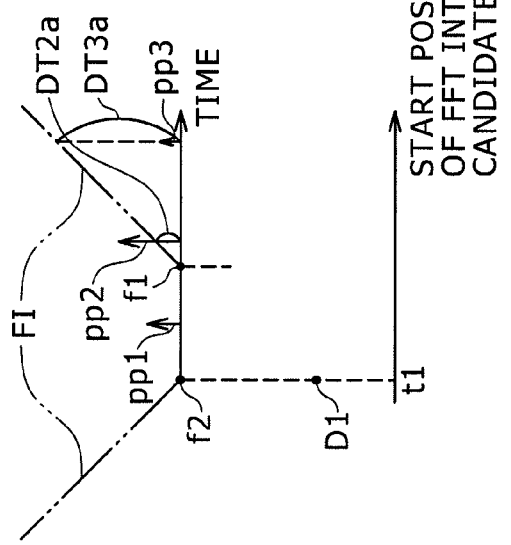

FIGS. 16A, 16B and 16C are schematic views showing typical results from the filtering process. The results in FIGS. 16A through 16C are obtained when the filtering process is performed by shifting the position (time) of the FFT interval candidate from left to right, e.g., from time t1 to time tN.

When the FFT interval candidate is set up in such a manner as to make time t1 its start position, the path p1 is found in a zero-gain interval, as shown in the upper part of FIG. 16A. The power pp1 of the path p1 is then multiplied by zero.

The path p2 is positioned subsequent to the rear-end position f1 of the zero-gain interval, so that the power pp2 of the path p2 is multiplied by a gain DT2a. The path p3 is also positioned subsequent to the position f1, so that the power pp3 of the path p3 is multiplied by a gain DT3a which is higher than the gain DT2a.

The graph in the lower part of FIG. 16A shows an estimated ISI amount as the sum of the results of the above multiplications. In FIG. 16A, the horizontal axis denotes start positions of the FFT interval candidate, and the vertical axis represents estimated ISI amounts. In the example of FIG. 16A, the estimated ISI amount is obtained as a value D1.

Likewise, when the FFT interval candidate is set up in such a manner as to make time tk its start position, the paths p1 and p2 are found in the zero-gain interval, as shown in the upper part of FIG. 16B. The power pp1 of the path p1 and the power pp2 of the path p2 are then multiplied by zero.

The path p3 is positioned subsequent to the rear-end position f1 of the zero-gain interval, so that the power pp3 of the path p3 is multiplied by a gain DT3b. In the example of FIG. 16B, the estimated ISI amount is obtained as a value Dk, as shown by the graph in the lower part of the figure.

When the FFT interval candidate is set up in such a manner as to make time tN its start position, the path p1 is positioned earlier than the front-end position f2 of the zero-gain interval, as shown in the upper part of FIG. 16C. The power pp1 of the path p1 is then multiplied by a gain DT1c.

Also, the path p2 is positioned earlier than the front-end position f2 of the zero-gain interval. The power pp2 of the path p2 is then multiplied by a gain DT2c which is lower than the gain DT1c.

The path p3 is positioned in the zero-gain interval, so that the power pp3 of the power p3 is multiplied by zero. In the example FIG. 16C, the estimated ISI amount is obtained as a value DN, as shown in the graph in the lower part of the figure.

The ISI estimation portion 152 supplies the minimum position search portion 153 with information indicating the relationship between the estimated amounts of ISI on the one hand and the start positions of FFT interval candidates on the other hand, the amounts and the positions being obtained through the filtering process in which predetermined positions are all used as the start positions of the FFT interval candidates.

Figure 17A:
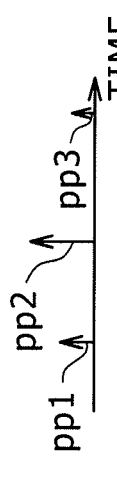
FIGS. 17A, 17B and 17C are schematic views explanatory of how symbol positions are detected.
Figure 17B:
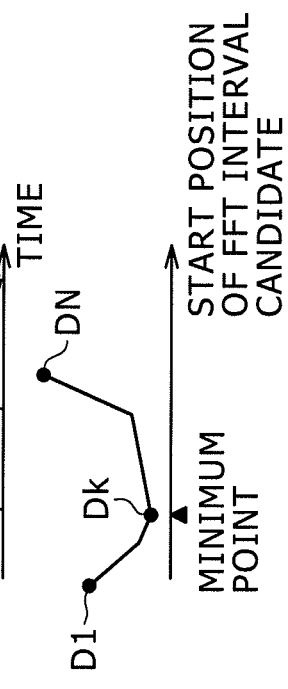
Figure 17C:
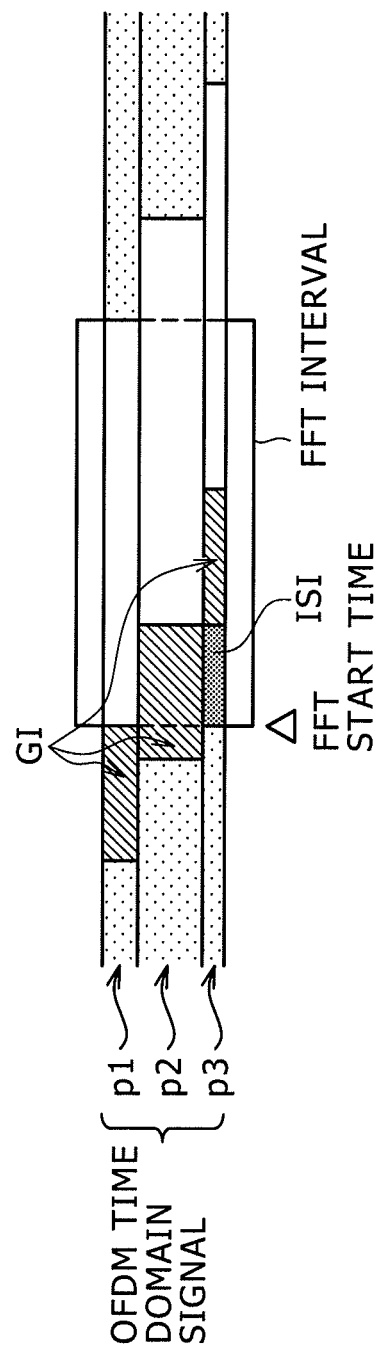

How the symbol position is detected by the minimum position search portion 153 will now be explained. FIGS. 17A, 17B and 17C are schematic views explanatory of how symbol positions are detected. FIG. 17A shows a delay profile, and FIG. 17B graphically indicates the relationship between estimated ISI amounts and the start positions of FFT interval candidates.

When the relationship between estimated ISI amounts and the start positions of FFT interval candidates is obtained as shown in FIG. 17B, the minimum position search portion 153 detects the position indicated by a solid-filled triangle pointing upward as the position in which the estimated ISI amount is minimum. The position where the estimated ISI amount is minimum is determined as the start position of the FFT interval, i.e., as the symbol position.

FIG. 17C shows a case in which an FFT interval is set up with the symbol position of FIG. 17B regarded as the start position of the interval. As shown in FIG. 17C, ISI is taking place only on the path p3. Because the power of the path p3 is lower than that of any other path, the ISI amount turns out to be smaller than if the FFT interval is positioned as shown in FIG. 13.

According to the second determination method, as described above, the position in which the ISI amount is minimum is determined as the symbol position.

Described below are the reasons why the third determination method is used in place of the second determination method. Illustratively, there may be cases where there exist a large number of paths of which the power is too low to detect using IFFT. In such cases, the symbol position determined by the second determination method may not be in fact an optimum position. The ISI taking place in conjunction with the paths whose power is too low to detect using IFFT is not taken into consideration by the second determination method.

This is where the third determination method comes in. The third determination method is a method whereby an optimum position is determined as the symbol position even if there exist numerous paths of which the power is too low to detect using IFFT.

[Third Determination Method]

Explained below is the third determination method by which the third symbol position determination block 134 determines the symbol position. On the basis of the symbol position determined by the third symbol position determination block 134, the interval targeted for processing by the control FFT section 115 is established, and an equalized signal is obtained accordingly. The equalized signal is fed back to the third symbol position determination block 134 which then determines the symbol position.

Before the discussion is started on the third symbol position determination block 134, an explanation will be made of the control FFT section 115. The control FFT section 115 processes a target interval shifted by S samples (time) relative to the interval targeted for FFT by the demodulation FFT section 108. A DFT flag output by the control DFT flag generation block 137 represents the start position of the target interval.

By carrying out DFT, the control FFT section 115 obtains information indicative of the difference from the result of FFT performed by the demodulation FFT section 108. Adding the difference information to the output of the demodulation FFT section 108 permits generation of an OFDM frequency domain signal which will be acquired if FFT is performed on the interval shifted by S samples.

That is, with the target section shifted by S samples, the control FFT section 115 performs a process equivalent to that which is carried out by the demodulation FFT section 108.

The interval targeted for processing by the demodulation FFT section 108 may be referred to as the demodulation FFT interval and the interval targeted for processing by the control FFT section 115 may be called the control FFT section where appropriate in the ensuing description. Whereas the operation performed by the control FFT section 115 is DFT, the output of the control FFT section 115 is equivalent to that of the demodulation FFT section 108, so that the interval targeted for processing by the control FFT section 115 is called the control FFT interval.

That the process performed by the control FFT section 115 is equivalent to the process carried out by the demodulation FFT section 108 will now be explained using mathematical expressions.

It is assumed that the start time of the demodulation FFT interval is zero and that the length of both the demodulation FFT interval and the control FFT interval is an effective symbol length N. The following expression (5) defines a signal $Y^0(\omega)$ at a frequency $\omega$ obtained by performing FFT on the OFDM time domain signal over the length N extracted from the demodulation FFT interval:

$$Y^0(\omega) = \sum_{k=0}^{N-1} r(k)e^{-j2\pi\frac{k\omega}{N}} \quad (5)$$

where, r(k) denotes the OFDM time domain signal at time "k," and "j" represents an imaginary quantity unit.

As shown in FIG. 18, suppose that the start time of the demodulation FFT interval is behind the start time of the control FFT interval by time "s." In this case, the OFDM time domain signal within the control FFT interval is given as r(s), r(s+1), ..., r(N−1+s). The following expression (6) defines a signal $Y^S(\omega)$ obtained by performing FFT on the control FFT interval:

$$Y^s(\omega) = \sum_{k=s}^{N-1+s} r(k)e^{-j2\pi\frac{k\omega}{N}} \quad (6)$$

$$= \sum_{k=0}^{N-1} r(k)e^{-j2\pi\frac{k\omega}{N}} + \sum_{k=N}^{N-1+s} r(k)e^{-j2\pi\frac{k\omega}{N}} -$$

$$\sum_{k=0}^{s-1} r(k)e^{-j2\pi\frac{k\omega}{N}}$$

$$= Y^0(\omega) + \sum_{k=0}^{s-1} \{r(k+N) - r(k)\}e^{-j2\pi\frac{k\omega}{N}}$$

As shown in FIG. 19, suppose that the start time of the demodulation FFT interval is ahead of the start time of the control FFT interval by time "s." In this case, the OFDM time domain signal within the control FFT interval is given as r(−s), r(−s+1), ..., r(−), r(0), r(1), ..., r(N−1−s). The following expression (7) defines a signal $Y^{-S}(\omega)$ obtained by performing FFT on the control FFT interval:

$$Y^{-s}(\omega) = \sum_{k=-s}^{N-1-s} r(k)e^{-j2\pi\frac{k\omega}{N}} \quad (7)$$

$$= Y^0(\omega) + \sum_{k=N-s}^{N-1} \{r(k-N) - r(k)\}e^{-j2\pi\frac{k\omega}{N}}$$

The first term in the expressions (6) and (7) above represents the result of FFT targeted at the demodulation FFT interval. The output of the demodulation FFT section 108 may be utilized unmodified as the value of the first term in the expressions (6) and (7).

The second term in the expressions (6) and (7) above denotes the result of DFT targeted at the OFDM signal over time "s." The control FFT section 115 performs operations to obtain the value of the second term in the expression (6) or (7) above, and adds the result of the operations to the output of the demodulation FFT section 108.

As shown in FIG. 4, the control FFT section 115 is made up of a control FFT controller 171, an arithmetic block 172, a selection block 173, a memory 174, a DFT arithmetic block 175, a memory 176, and an addition block 177.

The DFT flag output by the control DFT flag generation block 137 is input to the control FFT controller 171. The OFDM time domain signal output by the offset correction section 106 is input to both the arithmetic block 172 and the selection block 173. The OFDM frequency domain signal output by the demodulation FFT section 108 is input to the addition block 177.

The control FFT controller 171 controls the entire control FFT section 115 in operation in such a manner as to set a control FFT interval based on the DFT flag and to generate the result of FFT performed on the interval shifted by S samples relative to the demodulation FFT interval.

Using the shift amount given by the symbol synchronization section 107, the control FFT controller 171 determines selectively whether the start time of the control FFT interval is to be later than the star time of the demodulation FFT interval (i.e., the operation of the expression (6) is to be performed) or earlier than that start time (i.e., the operation of the expression (7) is to be performed).

The arithmetic block 172 subtracts the signal held in the memory 174 from the OFDM time domain signal supplied by the offset correction section 106. The signal thus obtained is output to the selection block 173.

Under control of the control FFT controller 171, the selection block 173 selects either the OFDM time domain signal supplied by the offset correction section 106 or the signal given by the arithmetic block 172. The selected signal is stored into the memory 174.

Illustratively, if the start time of the control FFT interval is later than the start time of the demodulation FFT interval as shown in FIG. 18, the selection block 173 selects the OFDM time domain signal coming from the offset correction section 106 when the signal input occurs during an interval A. When the signal input takes place during an interval B subsequent to the interval A by an effective symbol length N, the selection block 173 selects the signal from the arithmetic block 172 as the result of the subtraction.

Likewise, if the start time of the control FFT interval is earlier than the start time of the demodulation FFT interval as shown in FIG. 19, the selection block 173 selects the OFDM time domain signal coming from the offset correction section 106 when the signal input occurs during the interval A. When the signal input takes place during the interval B subsequent to the interval A by the effective symbol length N, the selection block 173 selects the signal from the arithmetic block 172 as the result of the subtraction.

Under control of the control FFT controller 171, the memory 174 stores the signal supplied by the selection signal 173. When the whole signal over the interval B in FIGS. 18 and 19 has been stored into the memory 174, the stored signal is retrieved by the DFT arithmetic block 175.

If the start time of the control FFT interval is later than the start time of the demodulation FFT interval, the DFT arithmetic block 175 operates on the second term in the expression (6) based on the signal retrieved from the memory 174. The result of the operation is output to the memory 176. The control FFT controller 171 sends the information of $2\pi k\omega/N$ in the expression (6) to the DFT arithmetic block 175.

If the start time of the control FFT interval is earlier than the start time of the demodulation FFT interval, the DFT arithmetic block 175 operates on the second term in the expression (7) based on the signal retrieved from the memory 174. The result of the operation is output to the memory 176. The control FFT controller 171 sends the information of $2\pi k\omega/N$ in the expression (7) to the DFT arithmetic block 175.

Under control of the control FFT controller 171, the memory 176 stores the result of the operation coming from the DFT arithmetic block 175. When the DFT arithmetic block 175 operates on the second term in the expression (6) or (7), the value stored in the memory 176 is retrieved by the addition block 177.

The addition block 177 adds the value retrieved from the memory 176 to the OFDM frequency domain signal output by the demodulation FFT section 108. The sum resulting from the addition is then output by the addition block 177.

The output of the addition block 177 represents the OFDM frequency domain signal obtained by performing FFT on the interval shifted by $Y^S$ in the expression (6) or by $Y^{-S}(\omega)$ in the expression (7), i.e., by the amount "s" relative to the demodulation FFT interval.

The OFDM frequency domain signal output by the addition block 177 is phase-adjusted by the phase adjustment section 116 shown in FIG. 5, before being supplied to the division section 117. The division section 117 corrects the transmission channel distortion of the signal using the same transmission channel characteristic as that which is used by the division block 199, and outputs an equalized signal. The equalized signal output by the division section 117 is fed to the third symbol position determination block 134 shown in FIG. 3 together with the equalized signal output by the division block 199.

The equalized signal generated by the division block 199 may be referred as the demodulation equalized signal, and the equalized signal generated by the division section 117 may be called the control equalized signal where appropriate in the ensuing description.

The third symbol position determination block 134 will now be described. As shown in FIG. 3, the third symbol position determination block 134 is made up of a signal quality calculation portion 161 and a search controller 162. The demodulation equalized signal coming from the division block 199 and the control equalized signal from the division section 117 are input to the signal quality calculation portion 161. The demodulation equalized signal and the control equalized signal are each an equalized signal regarding the same symbol.

The signal quality calculation portion 161 calculates the quality of the demodulation equalized signal as well as the quality of the control equalized signal, and outputs information indicative of the calculated qualities to the search controller 162.

Figure 20:
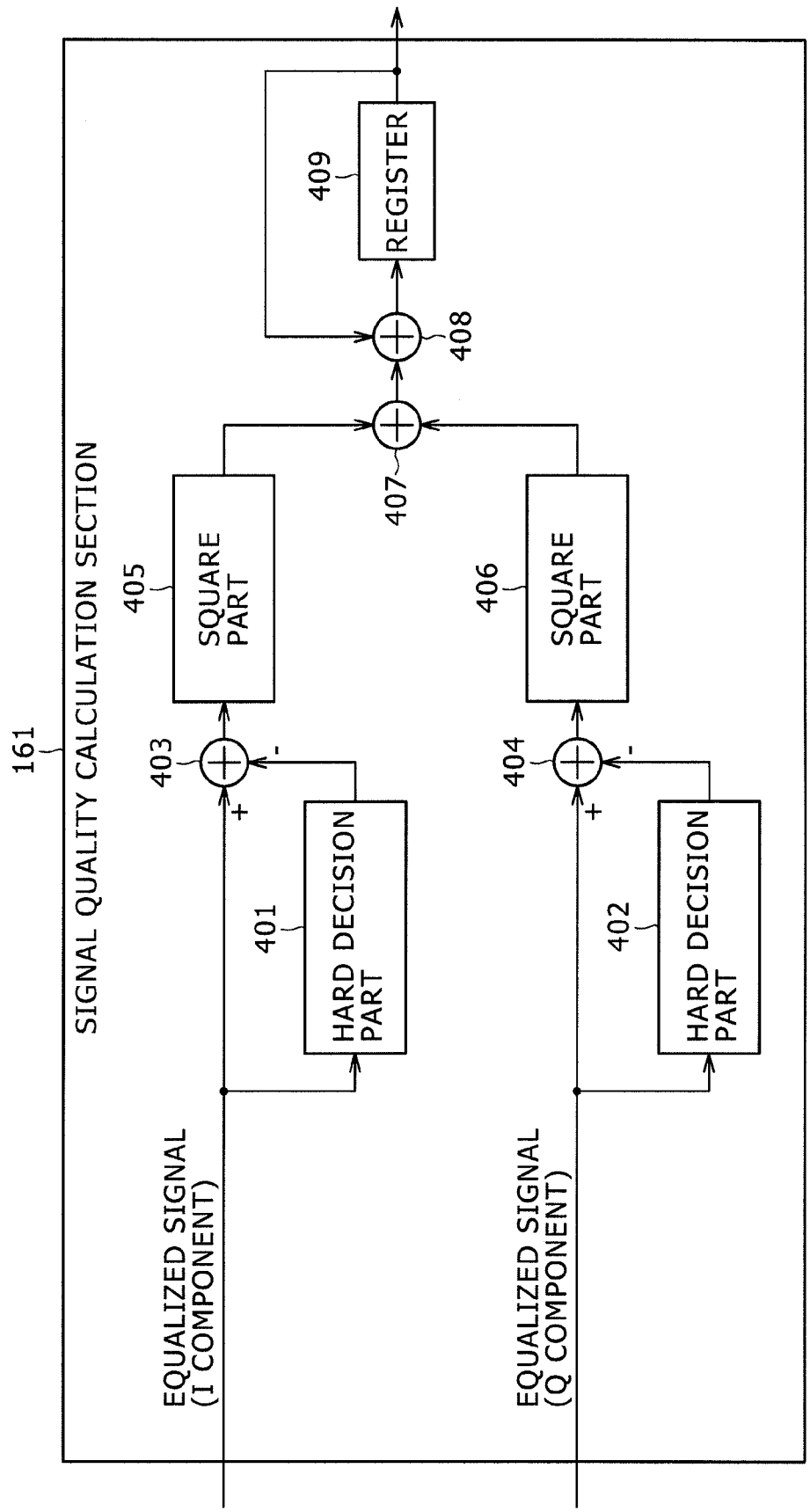
FIG. 20 is a block diagram showing a typical structure of a signal quality calculation section.

FIG. 20 is a block diagram showing a typical structure of the signal quality calculation portion 161. The demodulation equalized signal or the control equalized signal is split into an I component and a Q component before being input. An I component signal is input to a hard decision part 401 and to a subtraction part 403; a Q component signal is input to a hard decision part 402 and to a subtraction part 404.

The hard decision part 401 executes a hard decision on the input I component signal according to the modulation method in effect. The result of the hard decision is output to the subtraction part 403.

The hard decision part 402 executes a hard decision on the input Q component signal according to the modulation method in effect. The result of the hard decision is output to the subtraction part 404.

The subtraction part 403 obtains the difference between the output of the hard decision part 401 and the input I component section. The difference thus acquired is output to a square part 405.

The subtraction part 404 obtains the difference between the output of the hard decision part 402 and the input Q component section. The difference thus acquired is output to a square part 406.

The square part 405 squares the difference supplied by the subtraction part 403. The result of the calculation is output to an addition part 407.

The square part 406 squares the difference supplied by the subtraction part 404. The result of the calculation is output to the addition part 407.

The addition part 407 adds up the output of the square part 405 and that of the square part 406. The sum resulting from the addition is output to an addition part 408.

The addition section 408 adds up the output of the addition part 407 and the value held in a register 409. The addition section 480 performs the add operation as many times as a predetermined number of data, and outputs the accumulated result to the register 409. The accumulated result of the operations regarding the predetermined number of data is placed into the register 409 and is supplied from there to the search controller 162 shown in FIG. 3 as the information representative of the quality of the equalized signal.

The search controller 162 compares the quality of the demodulation equalized signal output by the signal quality calculation portion 161 with the quality of the control equalized signal. If the quality of the control equalized signal is found higher than the quality of the demodulation equalized signal, the search controller 162 outputs the symbol position indicating the start position of the current control FFT interval in such a manner that the same interval as the current control FFT interval will be set as the next demodulation FFT interval.

That is, if the signal of higher quality is obtained by targeting the control FFT interval instead of the demodulation FFT interval, then the demodulation FFT section 108 performs FFT on that interval conducive to yielding the higher-quality signal at the next timing.

Also, the search controller 162 sets the position obtained by shifting the start position of the current control FFT interval by a predetermined width, as the start position of the next control FFT interval, and outputs information indicative of the set position to the control DFT flag generation block 137. Illustratively, a position shifted in the direction opposite to the preceding shift direction may be set as the start position of the next control FFT interval.

On the other hand, if the quality of the demodulation equalized signal is found higher than the quality of the control equalized signal, then the search controller 162 outputs the symbol position indicating the start position of the current demodulation FFT interval in such a manner that the same interval as the current demodulation FFT interval will be set as the next demodulation FFT interval. That is, if high-quality signal can be obtained while the demodulation FFT interval remains targeted, then that state is maintained.

The search controller 162 then sets the position obtained by shifting the start position of the current control FFT interval by a predetermined width, as the start position of the next control FFT interval, and outputs information indicative of the set position to the control DFT flag generation block 137. Illustratively, a position shifted in the same direction as the preceding shift direction may be set as the start position of the next control FFT interval.

When the symbol position is determined as described above on the basis of the quality of the actual equalized signal, it is possible to provide higher reception performance than if the symbol position determined by the first or the second determination method is used.

[Selection of the Optimum Filter Coefficient]

The optimum filter coefficient selection block 200 will now be described below. This description, however, will be preceded by an explanation below of the interpolation filter for use by the frequency interpolation filter block 197.

If reference character Tu is assumed to denote the effective symbol length, i.e., the length of the interval of a single symbol minus GI, then the interpolation filter may illustratively be given a pass band width of about Tu/3 (sec.) or less. This interpolation filter is used to suppress repeat components included in the time direction characteristic estimation data generated by the time direction transmission channel estimation block 195, whereby an appropriate path representative of the transmission channel characteristic is extracted.

Explained below are the reasons why the time direction characteristic estimation data contains repeat components. The time direction characteristic estimation data is obtained from the OFDM frequency domain signal and thus constitutes frequency domain data.

As discussed above, the frequency interpolation filter block 197 generates time direction characteristic estimation data of which the data amount is tripled illustratively by interpolating two zeros. The time direction characteristic estimation data in the time domain and the zero value interpolation characteristic data in the time domain have the same frequency components.

Also, the time direction characteristic estimation data constitutes a sequence of sampled values indicative of the transmission channel characteristic at intervals of three subcarriers. If the effective symbol length is represented by Tu (sec.) and the subcarrier-to-subcarrier interval by Fc (Hz), then the expression Fc=1/Tu (Hz) holds. The expression 3Fc=3/Tu (Hz) defines the interval between sampled values of the time direction characteristic estimation data constituting a sequence of sampled values indicative of the transmission channel characteristic at intervals of three subcarriers.

Thus, the expression Fc=1/Tu (Hz) defines the interval between the sampled values of the zero value interpolation characteristic data obtained by interpolating two zeros between the sampled values of the time direction characteristic estimation data.

Meanwhile, the time direction characteristic estimation data of which the interval between sampled values is defined as 3Fc=3/Tu (Hz) is data with its cycle defined as 1/3Fc=Tu/3 (sec.) in the time domain. The zero value interpolation characteristic data of which the interval between sampled values is defined as Fc=1/Tu (Hz) is data with its cycle defined as 1/Fc=Tu (sec.) in the time domain, i.e., three times the cycle of the time direction characteristic estimation data.

As described, where the zero value interpolation characteristic data in the time domain has the same frequency components as those of the time direction characteristic estimation data in the time domain and has its cycle defined as three times that of the time direction characteristic estimation data, the zero value interpolation characteristic data in the time domain turns out to be data which is formed by repeating the time direction characteristic estimation data three times in the time domain.

Figure 21:
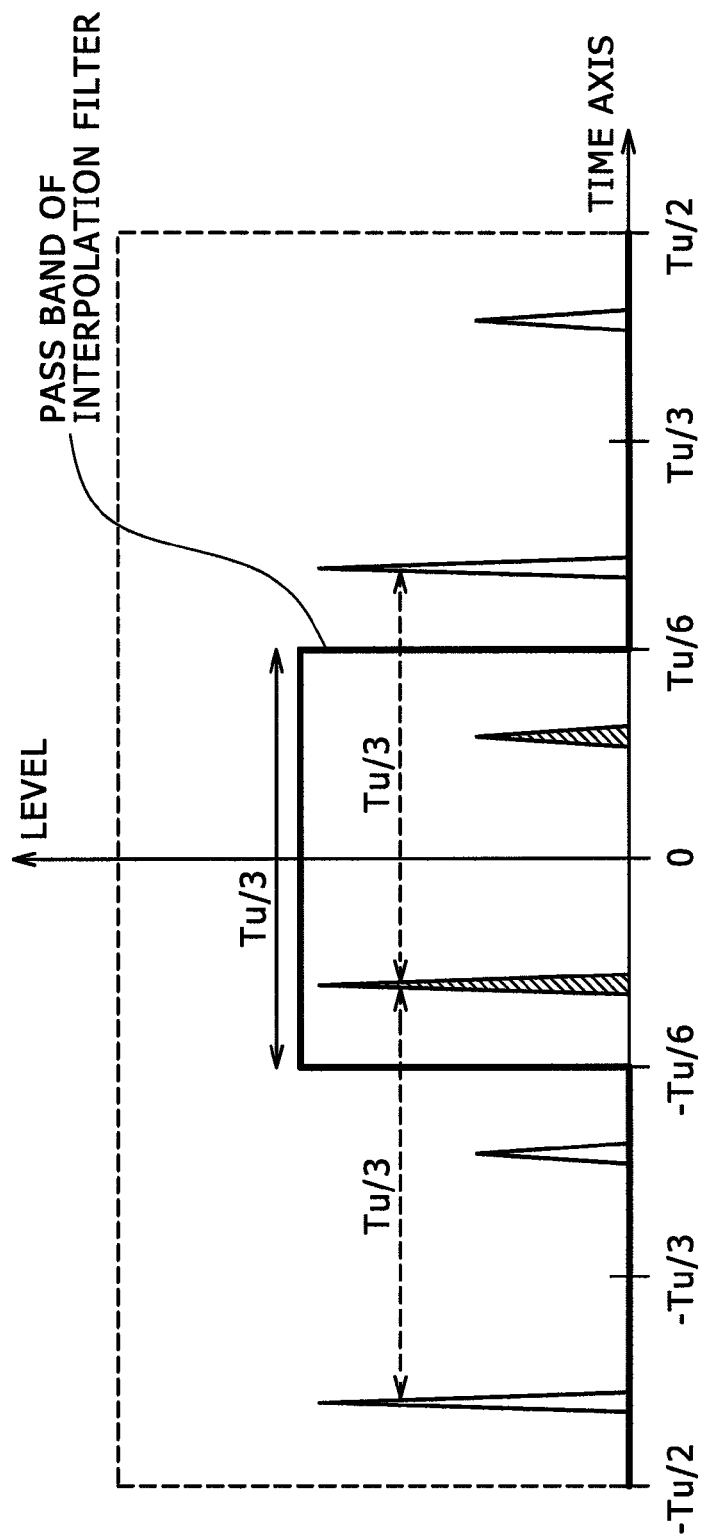
FIG. 21 is a schematic view showing typical zero value interpolation characteristic data in the time domain.

FIG. 21 is a schematic view showing typical zero value interpolation characteristic data in the time domain. This is an example with two paths: a main path and a preceding echo. In FIG. 21, the horizontal axis stands for time and the vertical axis denotes path power levels.

The zero value interpolation characteristic data whose cycle is given as Tu (sec.) is regarded as the data formed by repeating three times the multipaths corresponding to the time direction characteristic estimation data with its cycle defined as Tu/3 (sec.) in the time domain.

In FIG. 21, if the multipaths shown shaded at the center are extracted as frequency direction characteristic interpolation data, then other multipaths need to be removed in order to obtain appropriate multipaths corresponding to the frequency direction characteristic interpolation data.

Thus the frequency interpolation filter block 197 filters the zero value interpolation characteristic data to eliminate the multipaths except for the appropriate multipaths. The multipaths thus extracted correspond to the frequency direction characteristic interpolation data.

The zero value interpolation characteristic data constitutes frequency domain data. The filtering of the zero value interpolation characteristic data by the frequency interpolation filter block 197 involves convolving the filter coefficient of the interpolation filter with the zero value interpolation characteristic data which is frequency domain data.

Convolving in the frequency domain involves multiplication by a window function in the time domain. Thus the filtering of the zero value interpolation characteristic data may be expressed as the multiplication, in the time domain, of the zero value interpolation characteristic data by the window function corresponding to the pass band of the frequency interpolation filter block 197. The window function indicated by thick lines in FIG. 21 is a function which is used in the multiplication performed as the filtering of the zero value interpolation characteristic data and which corresponds to the pass band of the frequency interpolation filter block 197.

The cycle of the multipaths repeated three times is given as Tu/3 (sec.). Thus if the interpolation filter is provided in the form of an LPF with its pass band having the same width as that of the cycle Tu/3 (sec.) of the multipaths repeated three times, i.e., −Tu/6 through +Tu/6, then the appropriate multipaths corresponding to the frequency direction characteristic interpolation data can be extracted.

As described, the frequency interpolation filter block 197 utilizes an interpolation filter to extract appropriate multipaths. The width and center position of the pass band of the interpolation filter are adjusted in such a manner that all of the appropriate multipaths are included and that components such as white noise other than the actual paths are minimized within the pass band.

The optimum filter coefficient selection block 200 will now be described. As shown in FIG. 5, the optimum filter coefficient selection block 200 is made up of a filter center/band controller 211, memories 212 and 213, a transmission channel distortion correction portion 214, a frequency interpolation portion 215, a signal quality calculation portion 216, and an optimum value selection portion 217. The OFDM frequency domain signal output by the demodulation FFT section 108 is input to the memory 212. The time direction characteristic estimation data output by the time direction transmission channel estimation block 195 is input to the memory 213.

The filter center/band controller 211 controls write and read operations to and from the memories 212 and 213 in such a manner that data of the same symbol will be retained and retrieved.

The filter center/band controller 211 outputs a coefficient representing the width of the pass band of a trial interpolation filter (i.e., trial band) to the frequency interpolation portion 215 and optimum value selection portion 217.

Furthermore, the filter center/band controller 211 outputs a coefficient representing the center position of the pass band of a trial interpolation filter (i.e., trial center) to the transmission channel distortion correction portion 214, frequency interpolation portion 215, and optimum value selection portion 217.

The memory 212 retains one symbol worth of OFDM frequency domain signal supplied by the demodulation FFT section 108 under control of the filter center/band controller 211. The OFDM frequency domain signal held in the memory 212 corresponding to one symbol is retrieved by the transmission channel distortion correction portion 214.

Under control of the filter center/band controller 211, the memory 213 retains one symbol worth of time direction characteristic estimation data which is estimated by the time direction transmission channel estimation block 195 as data representing the transmission characteristic at intervals of three subcarriers. The time direction characteristic estimation data held in the memory 213 corresponding to one symbol is retrieved by the frequency interpolation portion 215.

The transmission channel distortion correction portion 214 is made up of a phase adjustment part 231 and a division part 232. The phase adjustment part 231 adjusts one symbol worth of OFDM frequency domain signal retrieved from the memory 212 in accordance with the trial center supplied by the filter center/band controller 211, and outputs the phase-adjusted OFDM frequency domain signal to the division part 232.

Where the OFDM frequency domain signal is phase-adjusted in accordance with the trial center, what takes place here is a process equivalent to adjusting the center position of the pass band of the interpolation filter.

Every time the transmission channel characteristic is supplied by the frequency interpolation portion 215, the division part 232 corrects the transmission channel distortion contained in the OFDM frequency domain signal corresponding to one symbol. The transmission channel distortion correction portion 214 outputs to the signal quality calculation portion 216 an OFDM frequency domain signal free of the distortion.

The frequency interpolation portion 215 is made up of a phase adjustment part 241 and a frequency interpolation part 242. The phase adjustment part 241 adjusts the phase of the time direction characteristic estimation data retrieved from the memory in accordance with the trial center supplied by the filter center/band controller 211. The phase-adjusted time direction characteristic estimation data is output to the frequency interpolation part 242.

The frequency interpolation part 242 up-samples the sampled value of the time direction characteristic estimation data by a factor of three. The frequency interpolation part 242 proceeds to perform a frequency interpolation process using the interpolation filter with its pass band width adjusted in accordance with the trial coefficient supplied by the filter center/band controller 211.

Through the frequency interpolation process, the frequency interpolation part 242 obtains the transmission characteristic of all subcarriers. The transmission characteristic thus acquired is output to the division part 232 of the transmission channel distortion correction portion 214.

The signal quality calculation portion 216 calculates the quality of the OFDM frequency domain signal corresponding to one symbol every time the signal is supplied by the transmission channel distortion correction portion 214. The quality thus calculated is output to the optimum value selection portion 217 as the result of the trial. Illustratively, the signal quality calculation portion 216 calculates the power of the noise included in the OFDM frequency domain signal, and outputs the calculated value.

The optimum value selection portion 217 successively retains the qualities calculated by the signal quality calculation portion 216. The optimum value selection portion 217 obtains the calculated qualities continuously until the width and center position of the pass band of the interpolation filter have been changed for trial on all patterns and the trials have been completed.

After acquiring the results of the trials on all patterns, the optimum value selection portion 217 selects the interpolation filter used to generate the OFDM frequency domain signal of the highest quality, and identifies the width and center position of the pass band of the selected interpolation filter.

With regard to the OFDM frequency domain signal of one symbol being targeted, the optimum value selection portion 217 thus determines the interpolation filter having a specific width as its pass band width and a specific position as the center position of its pass band in obtaining the signal of the highest quality.

The optimum value selection portion 217 outputs to the frequency interpolation filter block 197 the coefficient representing the pass band width of the selected interpolation filter. Also, the optimum value selection portion 217 outputs the coefficient denoting the center position of the pas band of the selected interpolation filter to the phase adjustment blocks 196 and 198, and the phase adjustment section 116.

Furthermore, the optimum value selection portion 217 considers the width the same as the pass band width of the selected interpolation filter to be the delay spread, and outputs information indicative of that delay spread to the second symbol position determination block 133 shown in FIG. 3.

In the optimum filter coefficient selection block 200, as described, signals on paths other than the main path leading from the time direction transmission channel estimation block 195 to the phase adjustment block 196 may be used to try the frequency interpolation process under a plurality of conditions wherein the width and the center position of the pass band of the interpolation filter are varied.

It is thus possible to select the interpolation filter conducive to obtaining the equalized signal of the highest quality. Given the determined width and center position of the pass band of the selected interpolation filter, the same interpolation filter as the selected one may be used to perform the frequency interpolation process on the signal of the main path.

The series of steps and processes described above may be executed either by hardware or by software. Where the software-based processing is to be carried out, the programs constituting the software may be either incorporated beforehand in the dedicated hardware of a computer or installed upon use from a suitable program recording medium into a general-purpose personal computer or like equipment for program execution.

FIG. 22 is a block diagram showing a typical hardware structure of a computer for executing the programs that handle the above-described steps and processes. In FIG. 22, a CPU (central processing unit) 501, a ROM (read only memory) 502, and a RAM (random access memory) 503 are interconnected by a bus 504.

An input/output interface 505 is also connected to the bus 504. The input/output interface 505 is connected with an input section 506 and an output section 507. The input section 506 is typically composed of a keyboard and a mouse, and the output section 507 is formed illustratively by a display and speakers. Also connected to the bus 504 are a storage section 508, a communication section 509, and a drive 510 that drives removable media 511. The storage section 508 is typically constituted by a hard disk and/or a nonvolatile memory, and the communication section 509 by a network interface.

In the computer structured as described above, the CPU 501 loads programs illustratively from the storage section 508 into the RAM 503 through the input/output interface 505 and bus 504 for program execution, thereby carrying out the above-described series of steps and processes.

The programs to be executed by the CPU 501 may illustratively be delivered recorded on the removable media 511 or offered through wired or wireless communication media such as local area networks, the Internet or digital broadcasts, before being installed into the storage section 508.

Also, the programs for execution by the computer may be processed in the depicted sequence of this specification (i.e., on a time series basis), in parallel, or in otherwise appropriately timed fashion such as when they are invoked.

It should be noted that embodiment of the present invention are not limited to the above-described embodiments but various modifications might be incorporated therein without departing from the scope and spirit of the present invention.

The present application contains subject matter related to that disclosed in Japanese Priority Patent Application JP 2008-253299 filed in the Japan Patent Office on Sep. 30, 2008, the entire content of which is hereby incorporated by reference.

What is claimed is:

1. A receiving apparatus comprising:
first position determination means for calculating correlation values between an orthogonal frequency division multiplexing time domain signal constituting an orthogonal frequency division multiplexing signal of the time domain representing an orthogonal frequency division multiplexing symbol, and a signal obtained by delaying said orthogonal frequency division multiplexing time domain signal by an effective symbol length, in order to determine the start position of a fast Fourier transform interval which is equal to said effective symbol length and which serves as a signal interval targeted for fast Fourier transform by fast Fourier transform means in reference to the highest of said correlation values;
second position determination means for estimating transmission channel characteristics of a known signal included in a first orthogonal frequency division multiplexing frequency domain signal constituting an orthogonal frequency division multiplexing signal of the frequency domain obtained by performing fast Fourier transform on said orthogonal frequency division multiplexing time domain signal, before interpolating the estimated transmission channel characteristics in the direction of time to obtain transmission channel characteristic estimation data, before performing inverse fast Fourier transform on said transmission channel characteristic estimation data to estimate a delay profile, before estimating an inter-symbol interference amount regarding each of a plurality of candidates of said fast Fourier transform interval based on said delay profile, before determining the start position of that candidate of said fast Fourier transform interval of which the inter-symbol interference amount is the lowest, as the start position of said fast Fourier transform interval targeted for fast Fourier transform by said fast Fourier transform means;
third position determination means for setting another fast Fourier transform interval in a shifted position relative to said fast Fourier transform interval used to generate said first orthogonal frequency division multiplexing frequency domain signal, before performing fast Fourier transform on said orthogonal frequency division multiplexing time domain signal within said another fast Fourier transform interval to generate a second orthogonal frequency division multiplexing frequency domain signal, before removing distortion from said first and said second orthogonal frequency division multiplexing frequency domain signals using the transmission channel characteristics of each of all subcarriers obtained by interpolating said transmission channel characteristic estimation data in the direction of frequency so as to generate an equalized signal, before determining the start position of said fast Fourier transform interval targeted for fast Fourier transform by said fast Fourier transform means based on the quality of the generated equalized signal;
selection means for selecting one of those start positions of said fast Fourier transform interval which are determined by said first through said third position determination means; and
said fast Fourier transform means for performing fast Fourier transform on said orthogonal frequency division multiplexing time domain signal by regarding the start position selected by said selection means as the start position of said fast Fourier transform interval in order to generate said first orthogonal frequency division multiplexing frequency domain signal.

2. The receiving apparatus according to claim 1, further comprising estimation means for estimating a symbol number of received data based on said first orthogonal frequency division multiplexing frequency domain signal;
wherein said selection means selects that start position of said fast Fourier transform interval which is determined by said first position determination means when demodulation is designated to be started, said selection means further selecting that start position of said fast Fourier transform interval which is selected by said second position determination means in place of the start position selected by said first position determination means when estimation of the symbol number by said estimation means is completed.

3. The receiving apparatus according to claim 2, further comprising frame synchronization means for synchronizing an orthogonal frequency division multiplexing transmission frame made up of a plurality of orthogonal frequency division multiplexing symbols on the basis of said first orthogonal frequency division multiplexing frequency domain signal;
wherein, when said orthogonal frequency division multiplexing transmission frame is synchronized by said frame synchronization means, said selection means selects that start position of said fast Fourier transform interval which is determined by said third position determination means in place of the start position determined by said second position determination means.

4. The receiving apparatus according to claim 1, wherein said first position determination means determines the position shifted from the highest of said correlation values by a guard interval length, as the start position of said fast Fourier transform interval targeted for fast Fourier transform by said fast Fourier transform means.

5. The receiving apparatus according to claim 1, wherein said second position determination means estimates the inter-symbol interference amount regarding each of a plurality of paths constituting multipaths, by multiplying that length in the time direction which is interfered with by another symbol when said candidates of said fast Fourier transform interval are set, by the power of the path being interfered with by said another symbol, and by adding up the products of the multiplications performed on each of said paths.

6. The receiving apparatus according to claim 1, wherein said third position determination means determines the start position of said fast Fourier transform interval used to generate said first orthogonal frequency division multiplexing frequency domain signal, as the start position of said fast Fourier transform interval targeted for fast Fourier transform by said fast Fourier transform means if the quality of the equalized signal obtained from said first orthogonal frequency division multiplexing frequency domain signal is higher than the quality of the equalized signal obtained from said second orthogonal frequency division multiplexing frequency domain signal, said third position determination means further determining the start position of said another fast Fourier transform interval used to generate said second orthogonal frequency division multiplexing frequency domain signal, as the start position of said fast Fourier transform interval targeted for the next fast Fourier transform by said fast Fourier transform means if the quality of the equalized signal obtained from said second orthogonal frequency division multiplexing frequency domain signal is higher than the quality of the equalized signal obtained from said first orthogonal frequency division multiplexing frequency domain signal.

7. A receiving method comprising the steps of:
causing first position determination means to calculate correlation values between an orthogonal frequency division multiplexing time domain signal constituting an orthogonal frequency division multiplexing signal of the time domain representing an orthogonal frequency division multiplexing symbol, and a signal obtained by delaying said orthogonal frequency division multiplexing time domain signal by an effective symbol length, in order to determine the start position of a fast Fourier transform interval which is equal to said effective symbol length and which serves as a signal interval targeted for fast Fourier transform by fast Fourier transform means in reference to the highest of said correlation values;
causing second position determination means to estimate transmission channel characteristics of a known signal included in a first orthogonal frequency division multiplexing frequency domain signal constituting an orthogonal frequency division multiplexing signal of the frequency domain obtained by performing fast Fourier transform on said orthogonal frequency division multiplexing time domain signal, before interpolating the estimated transmission channel characteristics in the direction of time to obtain transmission channel characteristic estimation data, before performing inverse fast Fourier transform on said transmission channel characteristic estimation data to estimate a delay profile, before estimating an inter-symbol interference amount regarding each of a plurality of candidates of said fast Fourier transform interval based on said delay profile, before determining the start position of that candidate of said fast Fourier transform interval of which the inter-symbol interference amount is the lowest, as the start position of said fast Fourier transform interval targeted for fast Fourier transform by said fast Fourier transform means;
causing third position determination means to set another fast Fourier transform interval in a shifted position relative to said fast Fourier transform interval used to generate said first orthogonal frequency division multiplexing frequency domain signal, before performing fast Fourier transform on said orthogonal frequency division multiplexing time domain signal within said another fast Fourier transform interval to generate a second orthogonal frequency division multiplexing frequency domain signal, before removing distortion from said first and said second orthogonal frequency division multiplexing frequency domain signals using the transmission channel characteristics of each of all subcarriers obtained by interpolating said transmission channel characteristic estimation data in the direction of frequency so as to generate an equalized signal, before determining the start position of said fast Fourier transform interval targeted for fast Fourier transform by said fast Fourier transform means based on the quality of the generated equalized signal;
selecting one of those start positions of said fast Fourier transform interval which, are determined by said first through said third position determination means; and
performing fast Fourier transform on said orthogonal frequency division multiplexing time domain signal by regarding the selected start position selected as the start position of said fast Fourier transform interval in order to generate said first orthogonal frequency division multiplexing frequency domain signal.

8. A program embedded on a non-transitory computer readable medium to cause a computer to execute a procedure comprising the steps of:
causing first position determination means to calculate correlation values between an orthogonal frequency division multiplexing time domain signal constituting an orthogonal frequency division multiplexing signal of the time domain representing an orthogonal frequency division multiplexing symbol, and a signal obtained by delaying said orthogonal frequency division multiplexing time domain signal by an effective symbol length, in order to determine the start position of a fast Fourier transform interval which is equal to said effective symbol length and which serves as a signal interval targeted for fast Fourier transform by fast Fourier transform means in reference to the highest of said correlation values;
causing second position determination means to estimate transmission channel characteristics of a known signal included in a first orthogonal frequency division multiplexing frequency domain signal constituting an orthogonal frequency division multiplexing signal of the frequency domain obtained by performing fast Fourier transform on said orthogonal frequency division multiplexing time domain signal, before interpolating the estimated transmission channel characteristics in the direction of time to obtain transmission channel characteristic estimation data, before performing inverse fast Fourier transform on said transmission channel characteristic estimation data to estimate a delay profile, before estimating an inter-symbol interference amount regarding each of a plurality of candidates of said fast Fourier transform interval based on said delay profile, before determining the start position of that candidate of said fast Fourier transform interval of which the inter-symbol interference amount is the lowest, as the start position of said fast Fourier transform interval targeted for fast Fourier transform by said fast Fourier transform means;

causing third position determination means to set another fast Fourier transform interval in a shifted position relative to said fast Fourier transform interval used to generate said first orthogonal frequency division multiplexing frequency domain signal, before performing fast Fourier transform on said orthogonal frequency division multiplexing time domain signal within said another fast Fourier transform interval to generate a second orthogonal frequency division multiplexing frequency domain signal, before removing distortion from said first and said second orthogonal frequency division multiplexing frequency domain signals using the transmission channel characteristics of each of all subcarriers obtained by interpolating said transmission channel characteristic estimation data in the direction of frequency so as to generate an equalized signal, before determining the start position of said fast Fourier transform interval targeted for fast Fourier transform by said fast Fourier transform means based on the quality of the generated equalized signal;

selecting one of those start positions of said fast Fourier transform interval which are determined by said first through said third position determination means; and performing fast Fourier transform on said orthogonal frequency division multiplexing time domain signal by regarding the selected start position selected as the start position of said fast Fourier transform interval in order to generate said first orthogonal frequency division multiplexing frequency domain signal.

9. A receiving apparatus comprising:

a first position determination section configured to calculate correlation values between an orthogonal frequency division multiplexing time domain signal constituting an orthogonal frequency division multiplexing signal of the time domain representing an orthogonal frequency division multiplexing symbol, and a signal obtained by delaying said orthogonal frequency division multiplexing time domain signal by an effective symbol length, in order to determine the start position of a fast Fourier transform interval which is equal to said effective symbol length and which serves as a signal interval targeted for fast Fourier transform by a fast Fourier transform section in reference to the highest of said correlation values;

a second position determination section configured to estimate transmission channel characteristics of a known signal included in a first orthogonal frequency division multiplexing frequency domain signal constituting an orthogonal frequency division multiplexing signal of the frequency domain obtained by performing fast Fourier transform on said orthogonal frequency division multiplexing time domain signal, before interpolating the estimated transmission channel characteristics in the direction of time to obtain transmission channel characteristic estimation data, before performing inverse fast Fourier transform on said transmission channel characteristic estimation data to estimate a delay profile, before estimating an inter-symbol interference amount regarding each of a plurality of candidates of said fast Fourier transform interval based on said delay profile, before determining the start position of that candidate of said fast Fourier transform interval of which the inter-symbol interference amount is the lowest, as the start position of said fast Fourier transform interval targeted for fast Fourier transform by said fast Fourier transform section;

a third position determination section configured to set another fast Fourier transform interval in a shifted position relative to said fast Fourier transform interval used to generate said first orthogonal frequency division multiplexing frequency domain signal, before performing fast Fourier transform on said orthogonal frequency division multiplexing time domain signal within said another fast Fourier transform interval to generate a second orthogonal frequency division multiplexing frequency domain signal, before removing distortion from said first and said second orthogonal frequency division multiplexing frequency domain signals using the transmission channel characteristics of each of all subcarriers obtained by interpolating said transmission channel characteristic estimation data in the direction of frequency so as to generate an equalized signal, before determining the start position of said fast Fourier transform interval targeted for fast Fourier transform by said fast Fourier transform section based on the quality of the generated equalized signal;

a selection section configured to select one of those start positions of said fast Fourier transform interval which are determined by said first through said third position determination section; and said fast Fourier transform section configured to perform fast Fourier transform on said orthogonal frequency division multiplexing time domain signal by regarding the start position selected by said selection section as the start position of said fast Fourier transform interval in order to generate said first orthogonal frequency division multiplexing frequency domain signal.

* * * * *